United States Patent [19]

Ricciardi et al.

[11] 4,301,510
[45] Nov. 17, 1981

[54] WEIGH FEEDER SYSTEM

[75] Inventors: Ronald J. Ricciardi, Garfield; Angelo Ferrara, Fairfield; Joseph L. Hartmann, West Caldwell, all of N.J.

[73] Assignee: Acrison, Incorporated, Moonachie, N.J.

[21] Appl. No.: 141,343

[22] Filed: Apr. 18, 1980

Related U.S. Application Data

[63] Continuation of Ser. No. 913,203, Jun. 6, 1978, Pat. No. 4,210,963, which is a continuation of Ser. No. 803,251, Jun. 3, 1977, abandoned, which is a continuation of Ser. No. 678,391, Apr. 19, 1976, Pat. No. 4,054,784, which is a continuation-in-part of Ser. No. 587,869, Jun. 18, 1975, abandoned.

[51] Int. Cl.³ .................... G01G 11/08; G06F 15/46
[52] U.S. Cl. .................................. 364/567; 364/571; 177/25
[58] Field of Search .................. 364/567, 571, 510; 177/59, 111, 114, 25; 141/83, 196; 222/52, 27, 58

[56] References Cited

U.S. PATENT DOCUMENTS

| | | | |
|---|---|---|---|
| Re. 27,115 | 4/1971 | Goff et al. | 222/58 |
| 266,157 | 10/1882 | Hurt et al. | 222/58 |
| 2,544,155 | 3/1951 | Harkenrider | 222/58 |
| 2,984,386 | 5/1961 | White | 222/58 |
| 3,116,801 | 1/1964 | Bauder et al. | 177/1 |
| 3,260,320 | 7/1966 | Clamp | 177/1 |
| 3,329,311 | 7/1967 | Goff et al. | 222/1 |
| 3,329,313 | 7/1967 | Mayer | 222/58 |
| 3,474,874 | 10/1969 | Pettis, Jr. | 177/50 |
| 3,477,529 | 11/1969 | Burn et al. | 177/50 |
| 3,481,509 | 12/1969 | Marhauer | 222/1 |
| 3,494,507 | 2/1970 | Ricciardi | 222/36 |
| 3,498,395 | 3/1970 | Henry | 177/1 |
| 3,511,412 | 5/1970 | Wolfenden et al. | 222/58 |
| 3,532,253 | 10/1970 | Godwin | 222/58 |
| 3,690,392 | 9/1972 | Smith | 177/59 |
| 3,692,212 | 9/1972 | Irie et al. | 222/52 X |
| 3,708,026 | 1/1973 | Senour | 177/60 |
| 3,724,720 | 4/1973 | Bullivant | 222/55 |
| 3,734,215 | 5/1973 | Smith | 177/59 |
| 3,805,903 | 4/1974 | Muskat et al. | 177/50 |
| 3,822,809 | 7/1974 | Foucault et al. | 222/71 |
| 3,837,415 | 9/1974 | Connors et al. | 177/123 |
| 3,855,458 | 12/1974 | Motter et al. | 222/55 X |
| 3,856,097 | 12/1974 | Bartio et al. | 177/1 |
| 3,889,848 | 6/1975 | Ricciardi et al. | 222/58 |
| 3,945,448 | 3/1976 | Sellers | 177/25 |
| 3,967,758 | 7/1976 | Ferrara | 222/58 |
| 3,985,266 | 10/1976 | Wright, Jr. | 222/22 |
| 4,023,021 | 5/1977 | Kuschel | 177/60 |
| 4,037,598 | 7/1977 | Georgi | 222/59 X |
| 4,054,784 | 10/1977 | Ricciardi et al. | 364/479 |
| 4,206,506 | 6/1980 | Lundahl et al. | 222/77 X |

FOREIGN PATENT DOCUMENTS

| | | |
|---|---|---|
| 1186175 | 2/1955 | Fed. Rep. of Germany ...... 364/567 |
| 1214054 | 10/1958 | Fed. Rep. of Germany ...... 364/567 |
| 1224054 | 11/1960 | Fed. Rep. of Germany ...... 364/567 |
| 1549191 | 2/1967 | Fed. Rep. of Germany ...... 364/567 |
| 1549291 | 11/1967 | Fed. Rep. of Germany ...... 364/567 |
| 490669 | 3/1970 | Fed. Rep. of Germany ...... 364/567 |
| 2060490 | 12/1970 | Fed. Rep. of Germany ...... 364/567 |

Primary Examiner—Edward J. Wise
Attorney, Agent, or Firm—Cooper, Dunham, Clark, Griffin & Moran

[57] ABSTRACT

Disclosed herein is an automatically controlled weigh feeding apparatus including a container prefilled with a substance, a device for discharging the substance from the container at a controllable weight, apparatus for weighing the container and its contents and for producing an electrical signal proportional to that weight, a first amplifier for amplifying the electrical signal, a first analog-digital converter coupled to said first amplifier and a digital computer coupled to said first analog-digital converter for computing the weight of substance remaining in the container. A second amplifier is coupled to said first amplifier and a ramp off-set circuit which is controlled by the digital computer inputs a second signal to the second amplifier means having a controlled stepping output applied as a second input signal to the second amplifier to maintain the output of the second amplifier within a given selected range of amplitude during one time cycle of operation. A second analog-digital converter interposed between the second amplifier and the digital computer. The digital computer is adapted to compute a corrective signal based on the signal received for controlling the discharge of the substance from the container.

8 Claims, 16 Drawing Figures

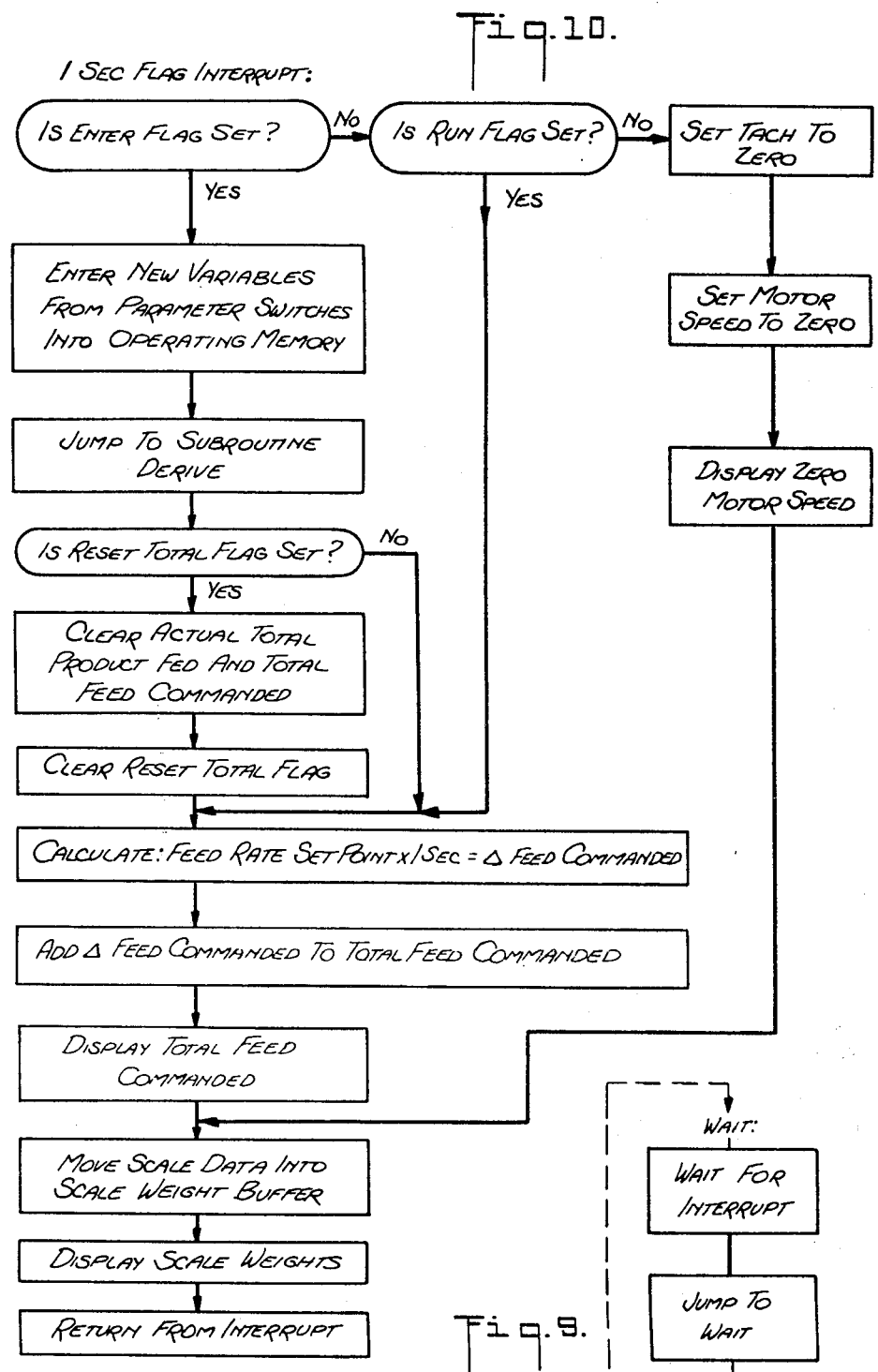

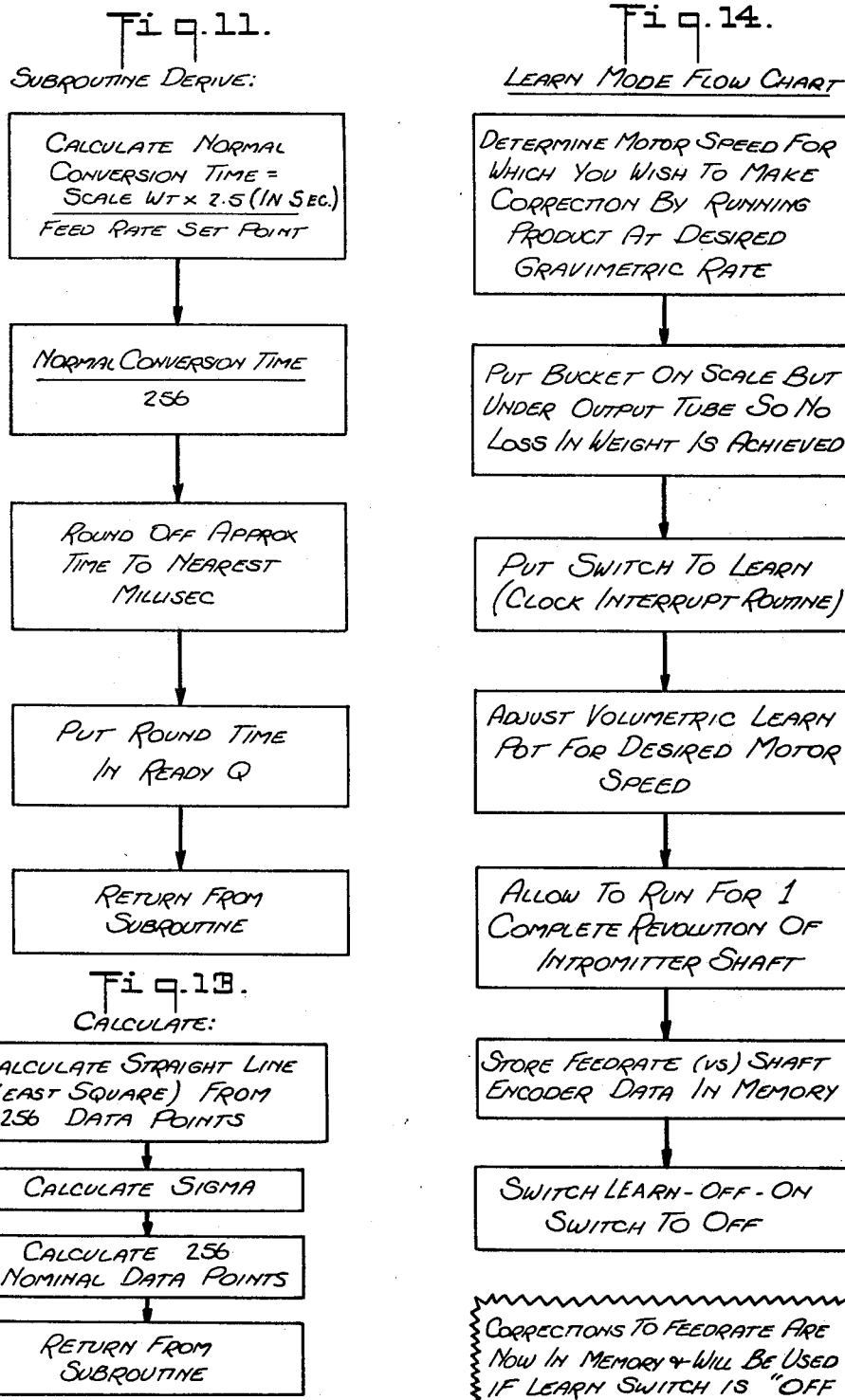

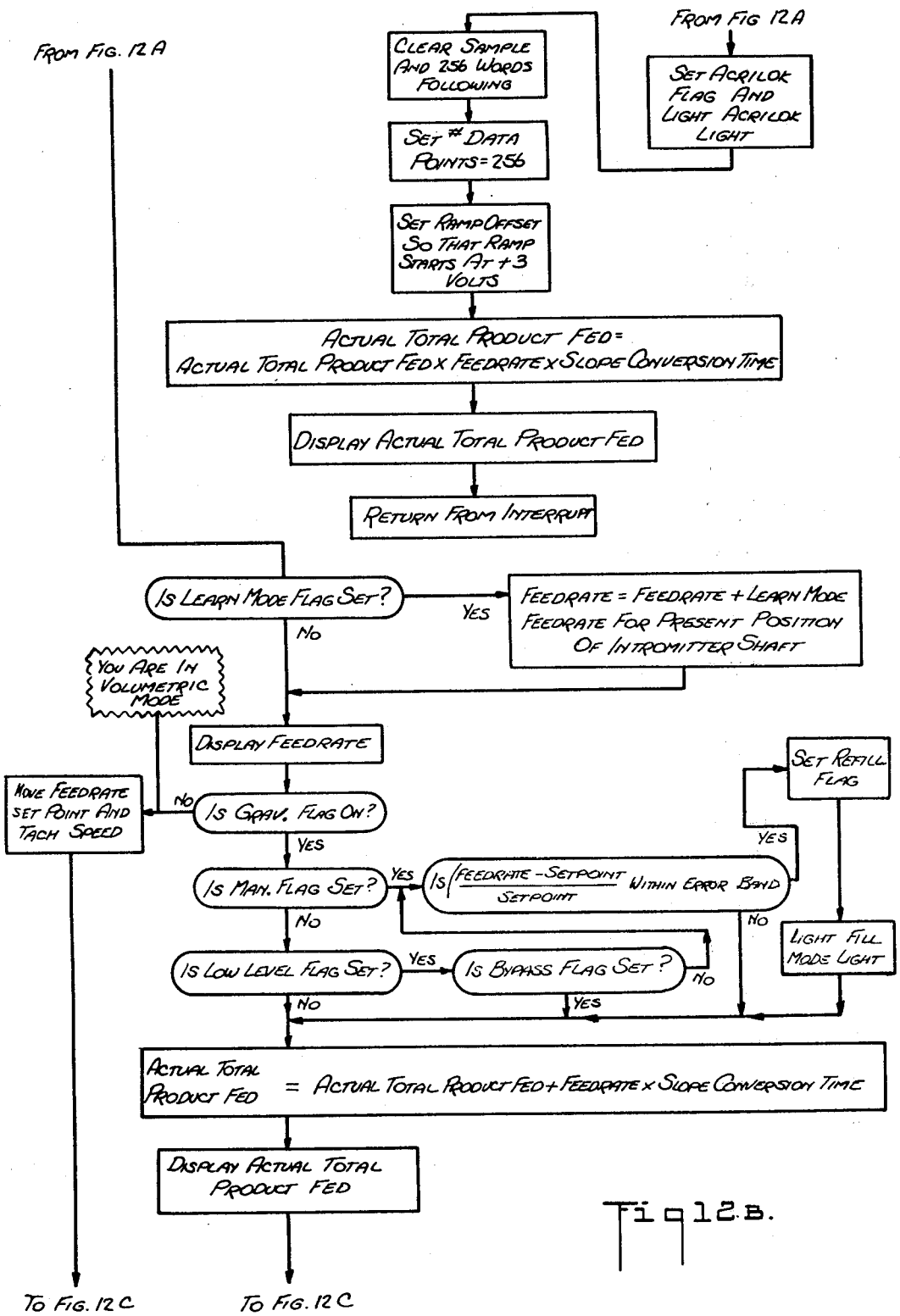
Fig 12.B.

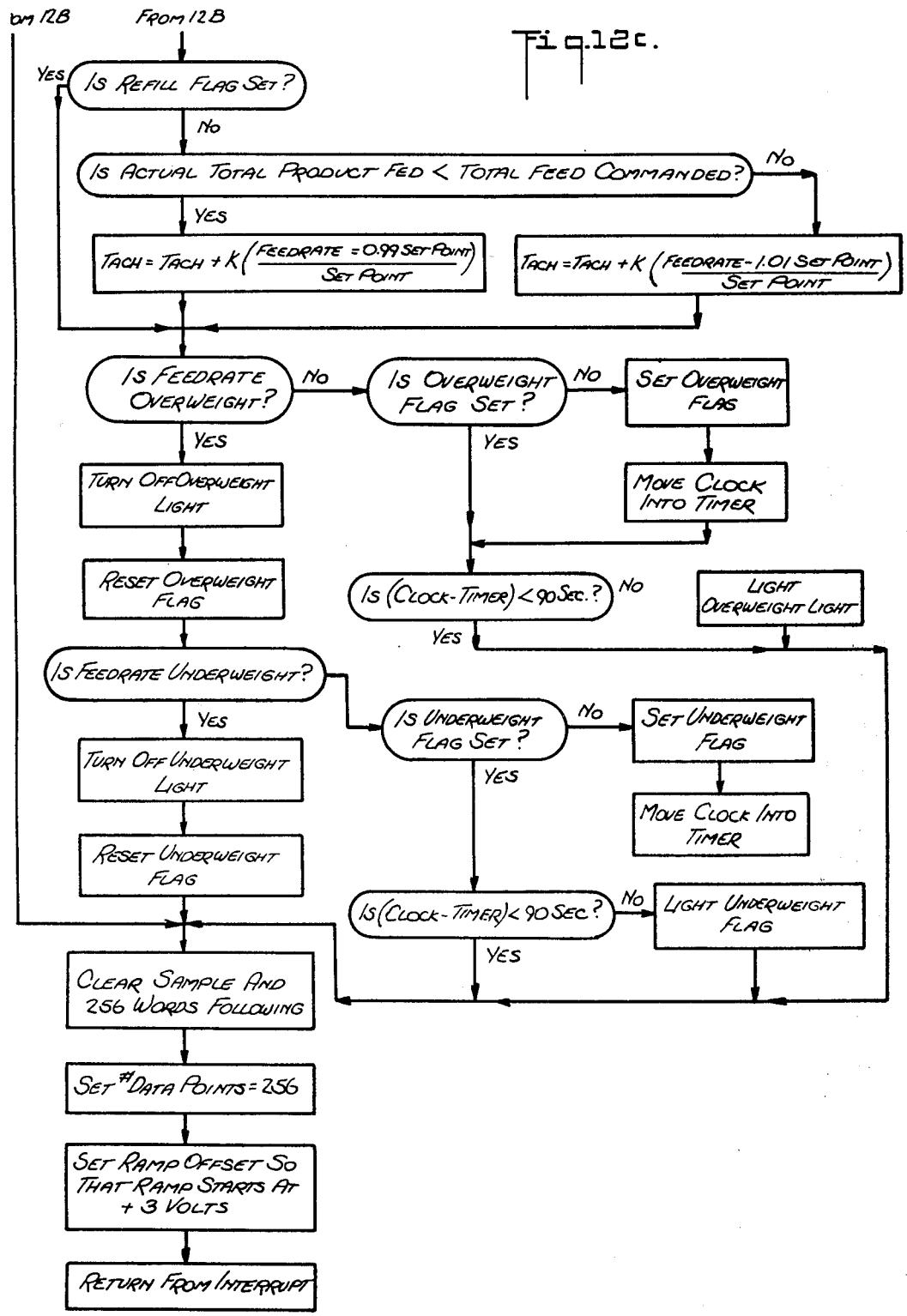

WEIGH FEEDER SYSTEM

This is a continuation of application Ser. No. 913,203, filed June 6, 1978, now U.S. Pat. No. 4,210,963, which is a continuation of application Ser. No. 803,251 filed on June 3, 1977, abandoned, which is a continuation of application Ser. No. 678,391 filed Apr. 19, 1976, which has issued as U.S. Pat. No. 4,054,784, which in turn is a continuation-in-part of application Ser. No. 587,869 filed June 18, 1975, abandoned.

This invention relates to weigh feeding systems and it is particularly applicable to apparatus for feeding fluid-like material. Systems constructed according to the present invention are particularly adapted, among other possible uses, for accurately weigh feeding a wide variety of substances including dry materials regardless of whether the material is free-flowing, sluggish, or pressure sensitive; and ranging from amorphous powders to flakes, pellets, chunks and even fibers, as well as liquids.

Various control weigh feeding systems have been known in the past, as for example, the system disclosed in U.S. Pat. application Ser. No. 345,587, filed Mar. 28, 1973 which issued as U.S. Pat. No. 3,889,848. In accordance with this application, there is provided a weigh feeding apparatus wherein the discharge rate of a fluid substance from a container is maintained at a predetermined constant value. The container and its contents are weighed, and an electrical signal is produced which signal has an amplitude proportional to the weight of the container and its contents. This electrical signal, which varies as the contents of the container are discharged, is differentiated and applied to a comparator circuit together with a reference signal, wherefore the output of the comparator circuit may be used to control said discharge rate of the substance as it is fed from the container. The comparator output is applied to a signal generator for producing a motor drive signal for a DC motor having its output shaft connected to drive a device for discharging the substance from the container. The signal generator may comprise a pulsing circuit for controlling a pair of SCR's which are disposed in a rectifying bridge circuit connected between an AC voltage source and the input of the DC motor. Accordingly, the speed of the motor is controlled by the pulsing circuit, which, in turn, is controlled by the algebraic sum of the output signal of a tachometer generator which is coupled directly to the motor shaft, and output signal from the comparator. It can be stated that the above-described apparatus provides an accurate weigh feeding system, whereby the feeding rate may be maintained at a constant value, and wherein the predetermined feeding rate may be adjusted by adjusting the value of the reference signal source.

Additionally, the output of the weighing device may be applied to a pair of differential amplifier circuits, along with a pair of reference voltage inputs, for determining when the contents of the container varies above and below desired maximum and minimum fill levels for the container. That is, circuitry is provided for automatically refilling the container when the weight of the substance therein reaches the desired minimum weight, and for terminating the filling process for the container when the fluid substance therein reaches the desired maximum weight. Such circuitry includes means for maintaining the discharge rate of the container at a constant rate equal to the instantaneous rate thereof immediately preceding energization of the filling device for the container. Particularly, the pair of differential amplifier circuits are coupled to a pair of relay driver circuits for controlling a relay circuit to energize the filling device when the substance in the container reaches the minimum weight, and for maintaining that filling device in an energized state until the container is refilled to its maximum desired level. The relay circuit is also coupled to the comparator circuit, for controlling the latter to produce a constant output during the refilling process for the container, thereby maintaining the discharge rate of the container at the value of the particular discharge rate thereof immediately preceding energization of the filling device.

As pointed out in said U.S. Pat. No. 3,889,848 in certain installations there exists a possibility of physical forces impinging upon the weigh feeder from an external source, such as wind or air currents, physical contact with the weigh feeder by operating personnel, or the like, for example. These forces cause the weigh feeder to move at a rate that is other than that resulting from the linear discharge of the contents of the container. Because such additional movement, i.e. acceleration, is an error and has no direct relationship to the actual discharge of material from the container, the control system could continue to perform its corrective function utilizing the erroneous output signal for comparison with the fixed set point reference signal derivative. The aforementioned patent discloses one means for preventing such excessive and abnormal movements of the weigh feeder scale from grossly affecting or disturbing the normal operation of the system to thereby prevent large excursions of the output feed rate.

The present invention is directed to new improved means for accomplishing the foregoing objectives, as well as additional objectives, as will become apparent as the description proceeds.

Another feature of the present invention resides in the provision of a new and improved weigh feeder system, which is capable of controlling more operating parameters, which operates faster, which provides a faster responsive action, and which is more accurate as compared to the prior art systems. In addition, the feeder system of the present invention has a memory and is capable of taking into account past errors in the material flow rate and taking corrective action with respect thereto.

Also, the system is capable of disregarding extraneous material flow rate readings, which may be caused by such factors as noise, vibrations, or the like, for example.

In one form of the invention, we provide a new and improved weigh feeding apparatus characterized by a container for a prefilled substance having means for discharging the substance therefrom at a controllable rate. A scale system is provided for weighing the container prefilled with the substance and an electrical circuit serves to produce a first electrical signal proportional in amplitude to the weight, and a high gain amplifier amplifies the electrical signal. An analog-digital converter (ADC) is coupled to the amplifier and a digital computer is adapted to receive pulse signals from the ADC for computing and outputting a signal corresponding to the signal received. Digital-analog converter ramp offset means which is controlled by the computer outputs a controlled stepping signal, that is applied as a second input to the amplifier means to algebraically combine therewith. Each step corresponds to one time cycle of operation, thereby maintaining the output of the amplifier in a given preselected range of amplitude during one time cycle of operation. The digital computer as another operation thereof computes a corrective signal based on the signal received, and means coupled between the computer and the means for discharging the substance from the container, serve to control the rate of discharge responsive to the corrective signal.

According to one aspect of the invention, the weigh feeder apparatus further comprises means for inputting into the digital computer a preselected feed rate, and the computer is adapted to store in memory a series of signals received from the ADC for each of the time cycles of operation and compute a corrective signal by comparing the signals received with the preselected feed rate. According to another aspect of the invention, the weight feeding apparatus further comprises an under-weight limit input means to the computer and an overweight limit input means thereto. The computer, as one operation thereof, causes an underweight or an overweight light to energize when an underweight or an overweight condition exists for longer than some preset period of time. Further, according to another aspect of the invention, the digital computer computes the corrective signal, while disregarding a preselected number of the signals received from the ADC, which exceed a set limit during one time cycle of operation, when computing the corrective signal.

The invention provides, according to another form thereof, a new and improved weigh feeding apparatus which is characterized by a container for a prefilled substance and means for discharging the substance from the container at a controllable rate of weight loss. A scale is provided for weighing the container prefilled with the substance and an electrical circuit is coupled to the weighing means for producing a first electrical signal proportional in amplitude to the weight determined by the weighing means. A first amplifier amplifies the electrical signal and a first analog-digital converter (ADC) is coupled to the first amplifier and outputs binary words to a digital computer coupled thereto. The digital computer, as one operation thereof, computes a first output signal corresponding to the weight of the substance in the container. A second amplifier amplifies a signal received from the first amplifier and a second ADC is coupled to the second amplifier and outputs a binary word signal to the digital computer. Digital-analog converter ramp offset means are provided which receive a signal from the digital computer and outputs a controlled stepping output which is algebraically combined with the input to the second amplifier, each step corresponding to one time cycle of operation, thereby to maintain the output of the second amplifier in a given preselected range of amplitude during one time cycle of operation. An input switch is provided to apply a preselected feed rate value to the computer. The computer, as another operation thereof, stores in memory a series of said signals received from the second ADC for each of the time cycles of operation and computes a corrective signal by comparing the signals received with the preselected feed rate value. Coupling means interconnect the computer and the means for discharging the substance from the container, whereby the corrective signal serves to control the rate of discharge of the substance from the container. A shaft encoder is coupled to the computer to allow vibration signals generated from the rotating machinery mounted on the scale to be corrected for in the computation of the feed rates.

In still another form of the invention there is provided a weigh feeding apparatus which includes a container for a prefilled substance, means for discharging the substance from the container at a controllable rate, means for weighing the container prefilled with the substance, and means coupled to the weighing means for producing electrical signals proportional to the weight determined by the weighing means. In addition, the apparatus further includes an analog-digital converter for receiving the electrical signals, digital computer means coupled to the analog-digital converter for computing a corrective signal based on the signals received, and means coupled between the computer means and the means for discharging the substance from the container for controlling the rate of discharge responsive to the corrective signal. Further, this weigh feeding apparatus comprises, means for inputting into the computer means a preselected feed rate, said computer means being adapted to store a series of the signals received from the analog-digital converter for a time cycle of operation and computing said corrective signal by comparing the signals received with the preselected feed rate, and said computer being further adapted to maintain the corrected signal constant during the time when a preselected number of the signals received from the analog-digital converter exceeds preselected upper or lower limits, during one time cycle of operation.

There has thus been outlined rather broadly the more important features of the invention in order that the detailed description thereof that follows may be better understood, and in order that the present contribution to the art may be better appreciated. There are, of course, additional features of the invention that will be described more fully hereinafter. Those skilled in the art will appreciate that the conception on which this disclosure is based may readily be utilized as the basis of the designing of other structures for carrying out the various purposes of the invention. It is important, therefore, that this disclosure be regarded as including such equivalent constructions and methods as do not depart from the spirit and scope of the invention.

One embodiment of the invention has been chosen for purposes of illustration and description, and is shown in the accompanying drawings forming a part of the specification, wherein:

FIG. 9 is a flow chart of the wait subroutine;

FIG. 10 is a flow chart of the one second interrupt display subroutine;

FIG. 11 is a flow chart of the derive subroutine;

FIGS. 12A, 12B and 12C is a flow chart of the main routine of the computer;

FIG. 13 is a flow chart of the calculate subroutine; and

FIG. 14 is a flow chart of the learn mode subroutine.

Figure 1:
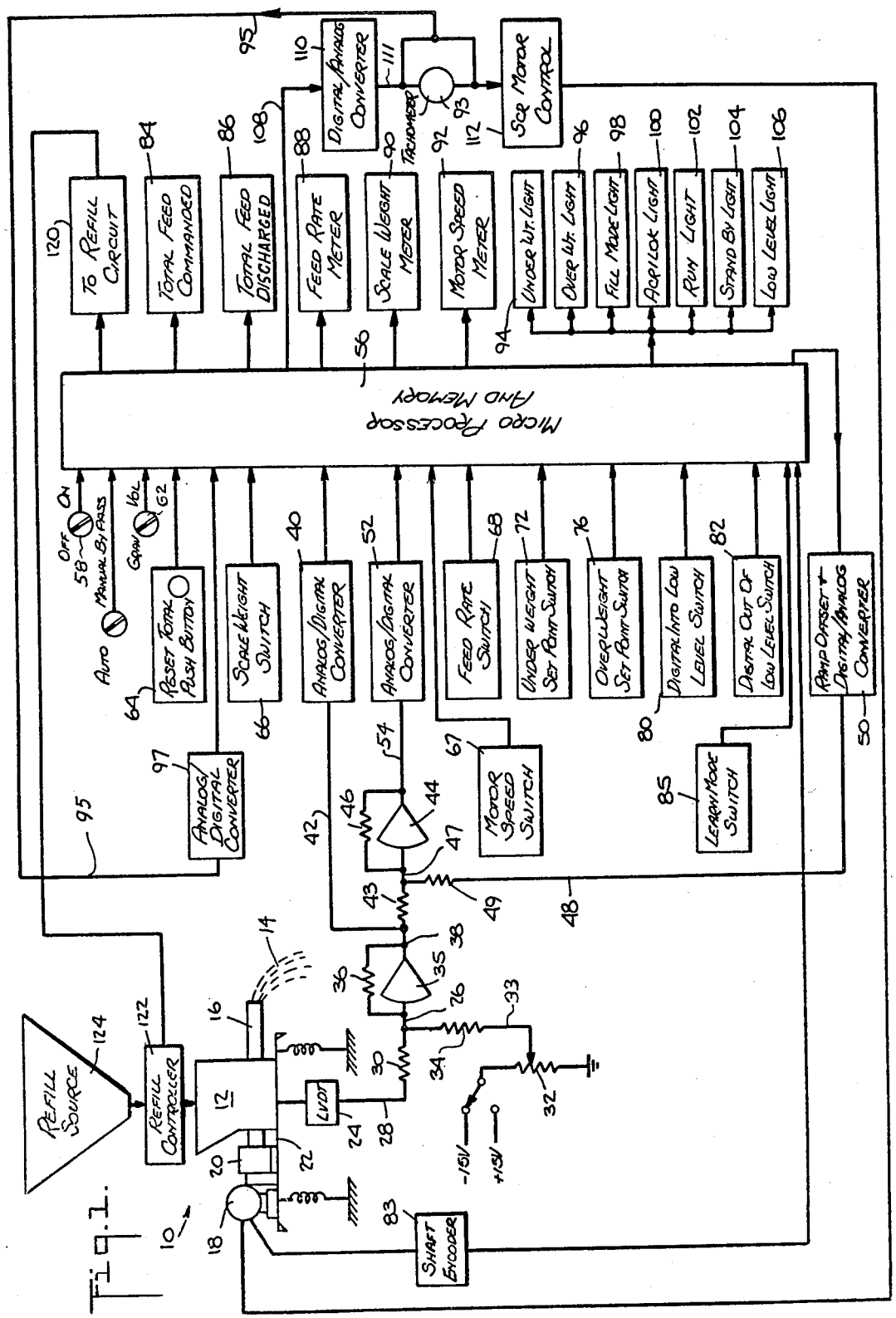
FIG. 1 is a block diagram of the weigh feeder system constructed in accordance with the concepts of the present invention.

The weigh feeder system of this invention, as shown diagramatically in FIG. 1, includes a feeder assembly indicated generally at 10, which comprises a container 12 with a discharge device connected thereto for feeding the substance 14 out of the container and through a discharge conduit 16. As illustrated, a DC motor 18, connected to a gear-reduction device 20 is provided for driving the discharge device. The feeder assembly may comprise an auger mechanism as disclosed in detail in U.S. Pat. No. 3,186,602 issued June 1, 1965. The entire feeding assembly, including the container, the discharge device, the motor, and the gear-reduction device is mounted on a scale 22, which may comprise a structure as described in detail in U.S. Pat. No. 3,494,507, issued Feb. 10, 1970.

Figure 2:
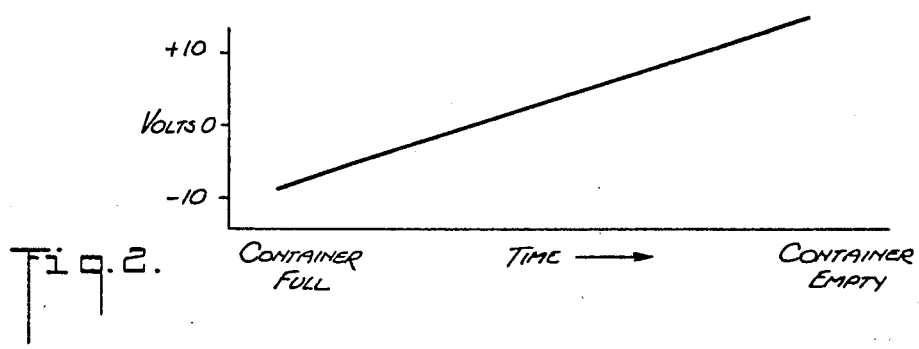
FIG. 2 is a graphic representation of the output voltage with respect to time of one of the amplifier circuits of the present invention.

In accordance with the invention there is provided a detecting device, as for example, a linear variable differential transformer (LVDT) 24, coupled to the scale for providing an electrical signal having an amplitude which is proportional to the weight of the container and its contents. That is, as the contents of the container 12 are discharged, a relative movement occurs between the windings and the core of the LVDT, thereby causing a varying output voltage proportional to the varying weight of the container and its contents. Thus, as the substance is discharged from the container, the LVDT provides an electrical signal which varies in response to such discharge, which may, for example, be a DC voltage with a range of the order of from $\Delta 3$ volts to $\Delta 6$ volts when the material in the container drops from its upper level to its lower level. The signal from the LVDT is applied to a summing junction 26 by a conductor 28, through a resistor 30. Also, applied to the summing junction 26 is an offset potentiometer means 32, by a conductor 33 through a resistor 34, to render the signal from the LVDT symmetrical with respect to zero as measured at 38. The output from the summing junction 26 is applied to an amplifier 35, having a gain potentiometer 36, to produce an output signal at 38, which ranges, for example, from $-10$ volts when the container 12 is full to a $+10$ volts when the container is empty, as shown by the curve in FIG. 2. The output signal from the amplifier 35 is applied to a conventional analog-digital converter (ADC) 40, by way of a conductor 42, wherein the offset amplified LVDT signal is measured and digitalized and outputted as digital words, corresponding to the total scale weight, i.e. the quantity of material contained in the container 12. Any suitable type of ADC may be employed such as a 12 bit, Model No. 124-10 XW 3, as manufactured by Analog Devices, Inc.

Figure 3:
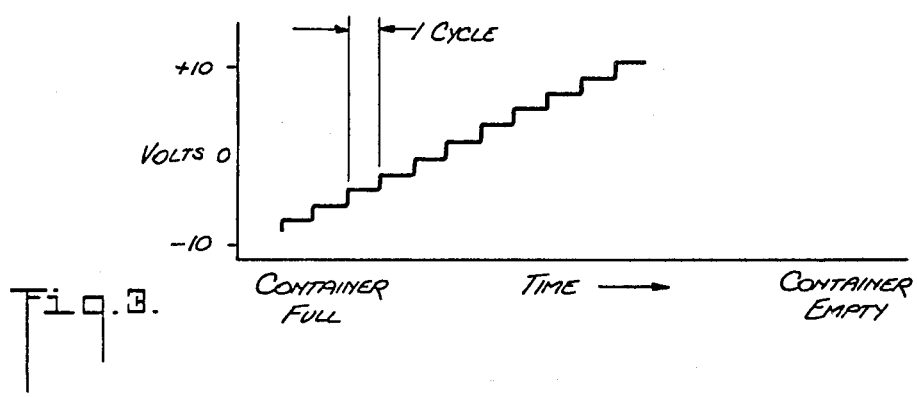
FIG. 3 is a graphic representation of the output of a controlled ramp offset circuit of the present invention.
Figure 4:
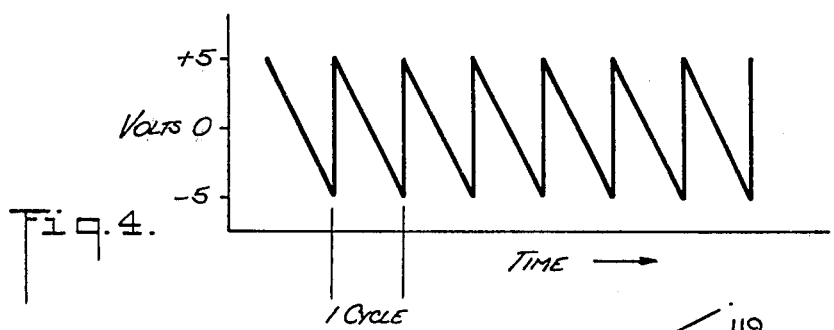
FIG. 4 is a graphic representation of the output of a second amplifier circuit.

In addition, the output signal from the amplifier 35 is applied through a resistor 43 to a second amplifier 44, having a feed back resistor 46, thereby to provide a gain of the order of about a 700 multiple. Applicants have found that a gain of this order is necessary in order to make the desired calculations later in the system, but with such a gain, the voltage would normally be too high, as a practical matter, for computational use, and therefore, a controlled ramp offset signal is also applied to a summing junction 47 by a conductor 48 through a resistor 49. This offset signal is provided by a ramp offset digital-analog converter (DAC) 50, which receives controlled digital words or binary bits and converts them to a step-shaped signal, having a frequency corresponding to one time cycle of operation of the process system, as shown by the curve in FIG. 3. This ramp offset functions in cooperation with the amplifier 44 so that a controlled quantity is subtracted from the input to the amplifier, whereby during one time cycle of operation the output from the amplifier 44 gradually decreases from about $+5$ volts to about $-5$ volts. The ramp offset 50 is a fast acting electronic servo (typically 50 microseconds), and is controlled so that between time cycles of operation its output is adjusted one step as shown in FIG. 3. Thus, at the beginning of the next succeeding time cycle, the output from the amplifier 44 is again about $+5$ volts as shown in FIG. 4. Any suitable type of ramp offset DAC may be employed, such as a 14 bit Model ZD354M1, having a resolution of 1 part in 10,000, as manufactured by Zeltex, Inc., for example. The amplifiers 35 and 44 may be of any suitable type such as Model OP05EJ, as manufactured by Precision Monolithics, Inc., for example.

The output from the amplifier 44 is applied to a conventional 12 bit analog-digital converter (ADC) 52 by a conductor 54, wherein the output signal from the amplifier is measured and digitalized. The output from the ADC is in the form of digital words corresponding to the scale weight, but greatly amplified.

A binary number system is employed as the code for information handling because of certain advantages hereinafter brought out. Thus, as seen in FIG. 1, the weigh feeder system is provided with a digital computer 56, which includes processing, memory and control systems. Any suitable digital computer may be employed such as a micro processor Model IMP16C/300 and memory Model IMP16P/004P, as manufactured by National Semiconductor Corp., for example.

Still referring to FIG. 1, a plurality of inputs are applied to the processor to control the same. A conventional off-on switch 58 serves to control the main power supply to the processor. A switch 60 is provided whereby the refill sequence may be automatically actuated (switch in "auto") when product level reaches low level, or at any product level (switch in "manual") or, the refill sequence may be bypassed (when switch is in "bypass"). The refill sequence is a procedure wherein the motor speed will not lockout for refill thereby actuating the refill controller until the computer first senses that the scale is undisturbed by foreign influences and secondly, senses that the feed rate agrees with the set feed rate. Input switch 62 serves to convert the system between gravimetric control and volumetric control, as desired. This will be explained more fully hereinafter. A reset total push button switch 64 serves to reset the processor for an entirely new batch of data. Also, there is provided a scale weight switch 66, that inputs into the processor the scale weight, S, which is determined by the size or model of the feeder assembly 10 being employed in the particular installation. This factor is set once and is not adjusted unless a new model or size of feeder assembly is installed.

A motor speed input switch 67 is provided, which is set by the operators at a preselected percent in the range between 0% to 100%, to input into the processor the desired operating speed of the motor when operating volumetrically.

Input switch 68 is actuated by the operator to input the desired feed rate R (LBS./HR) into the processor. This is a 16 bit digital word, stored in memory, that represents the desired slope of the feed line or curve 70, FIG. 5. Input switch 72 is also actuated by the operator to input the underweight set point into the processor memory. It represents the selected minimum limit of the feed rate range, as is indicated by the dotted line 74 in FIG. 5. This limit is expressed as a percentage of from 0 to 9.99% below the desired feed rate R. Input switch 76 inputs the overweight set point into memory. It represents the selected maximum limit of the feed range, as is indicated by the dotted line 78 in FIG. 5. This limit also is expressed as a percentage of from 0 to 9.99% above the desired feed rate R.

Still referring to FIG. 1, digital switch 80 is an operator activated switch to input into the memory, the desired minimum or low level of the material in the container 12. The range of this switch is from 0 to 99.9%. Thus, for example, if the operator desires the system to shift into its refill mode when the container 12 is down to 5% of its capacity, he sets the low level switch 80 at 5.0%. Digital input switch 82 is an out of low level switch with a range of from 0 to 99.9% so that the operator can input into memory the desired level for the system to shift out of its refill mode to its normal operative mode. Thus, for example, the operator could set this switch for 90.0%, whereby when the container 12 reaches 90% of its capacity, the system would shift out of its refill mode to its normal operative mode.

Figure 6:
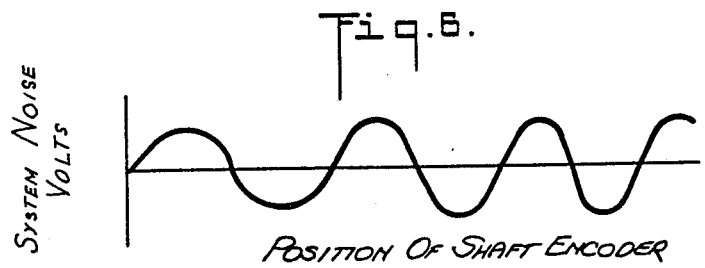
FIG. 6 is a graphic representation of the positional relationship of the shaft encoder with respect to the system noise.
Figure 7:
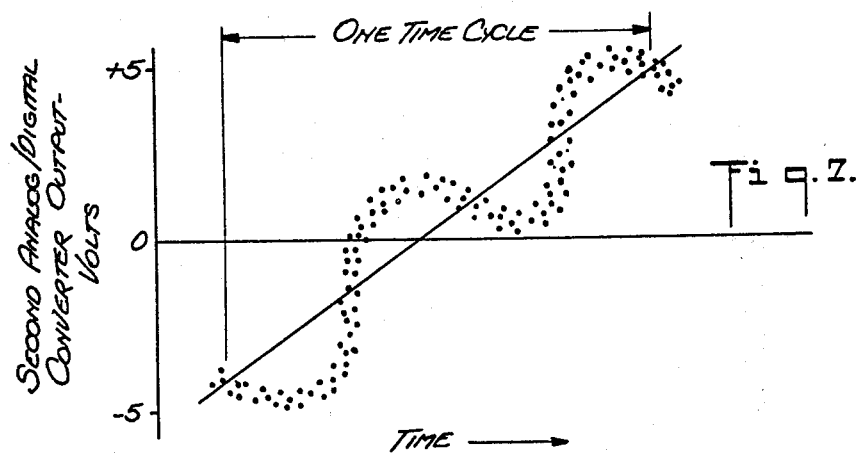
FIG. 7 is a graphic representation of the output of the second analog-digital converter with respect to time, before correction for induced system noises.
Figure 8:
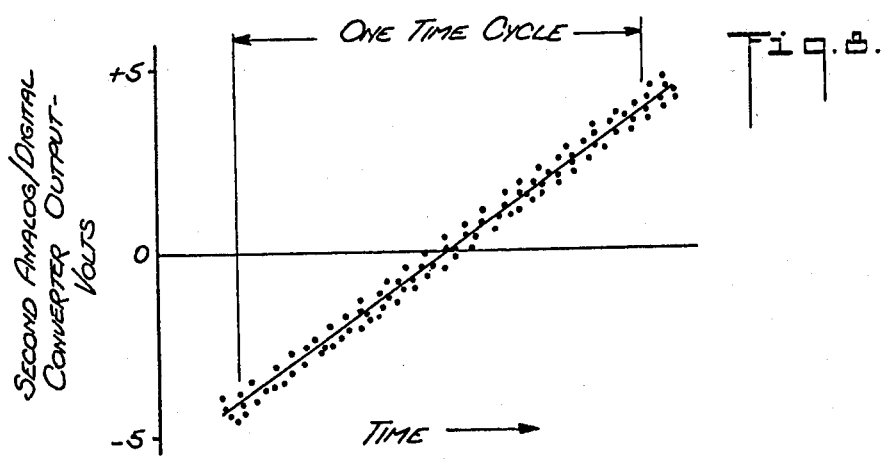
FIG. 8 is a graphic representation of the output of the second analog-digital converter with respect to time, after correction for induced system noises.
Figure 12A:
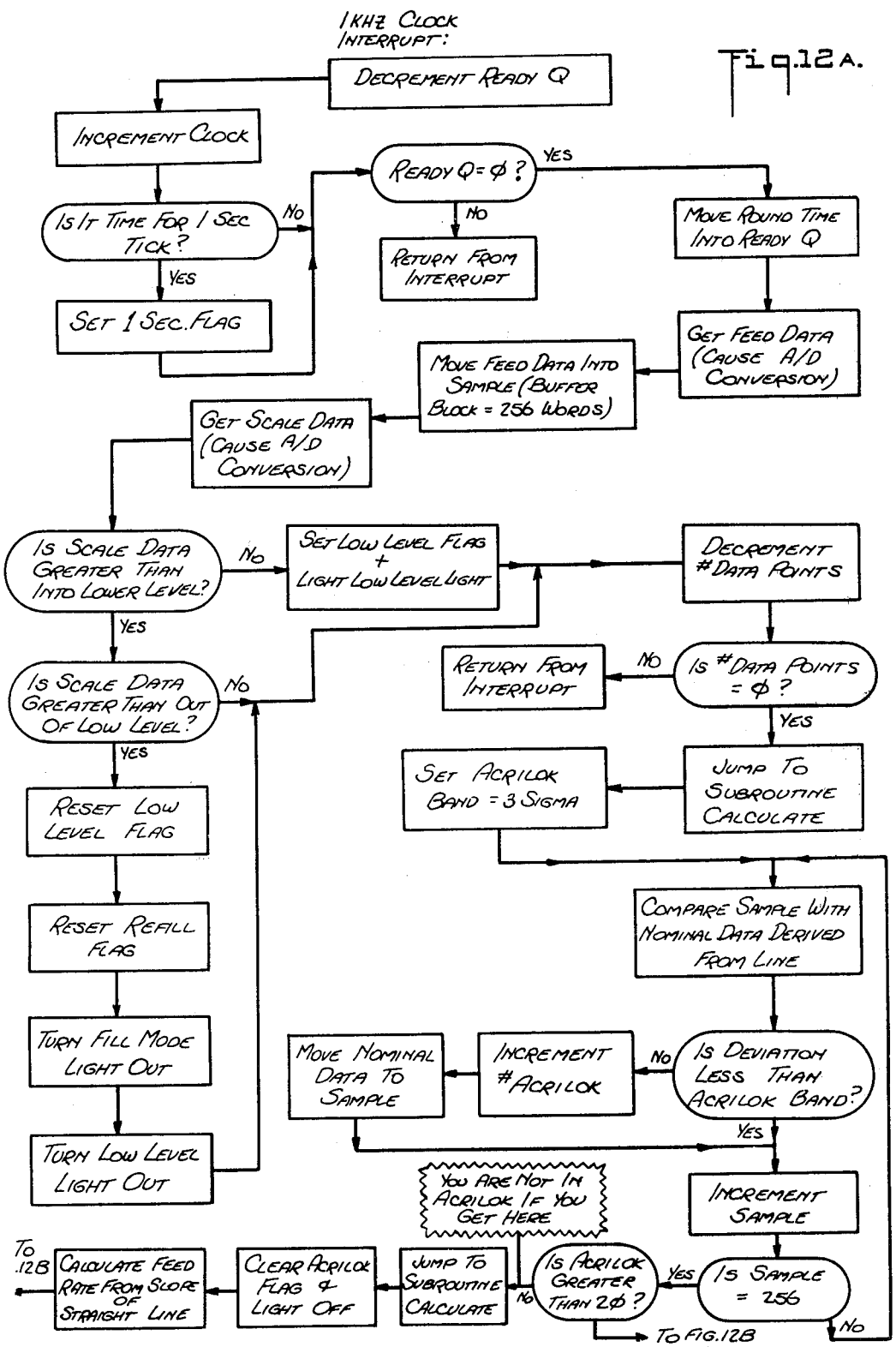

In addition, the processor also receives a signal from a shaft encoder 83. This allows a correlation to be made between the shaft angle and the system noises induced by the movement of the machinery mounted on the scale or movement of the product in the storage hopper. This correlation may then be used as a correction factor, subtracting out noise components due to moving machinery on the scale such as for example, the motor, gear box, augers, as well as movement of the material in the container. The processor 56 is provided with a learn mode input switch 85, which is shiftable between normal operation and learn mode operation. When a new material is going to be processed by the system or when the system is first installed, the system is set in operation, but instead of discharging the substance 14 out of the system, it is collected in a small container, not shown, and retained on the scale 22 so that there is no net loss of weight from the scale. The switch 85 is shifted to its learn mode position. The motor 18 is run throughout its speed range and the shaft encoder 83 senses the shaft angle, at the various speeds of rotation, while the input circuit through the LVDT 24 picks up the noise corresponding to the rotational position of the drive shaft and sends out digital signals to the processor, which are stored in memory. After this information has been stored in memory, the small container is removed from the scale and the switch 85 is shifted to its normal operation. FIG. 6 illustrates the positional relationship of the shaft encoder 83 with respect to the induced system noise for a particular speed during the learn mode of operation. FIG. 7 illustrates the output of the ADC 52 with respect to time, before it is corrected for the induced system noises. Processor 56, as another operation thereof, subtracts the system noise stored data from the data received from the ADC 52 to present corrected values of this information for processing. FIG. 8 illustrates the corrected output from the ADC 52 for one time cycle of operation. Any suitable type of shaft encoder may be employed such as a Series 2500, Optical Encoder, as manufactured by Renco Corporation.

The microprocessor 56 has, as an output, a display device 84 which indicates the total feed commanded. This device indicates the total feed asked for by the operators over a relatively long period of time. Thus, the processor, as one operation therof, receives the selected feed rate R from the input switch 68 and integrates it with respect to the elapsed time and continuously displays the total feed commanded, in pounds. As another output there is provided a display device 86 which indicates the actual total feed discharged from the feeder assembly 10. Thus, the processor, as one operation thereof, receives a signal from the ADC 40 corresponding to the total scale weight, which indicates the quantity of material remaining in the container. This signal represents the amount of weight of material in the feeder 12. Any change in this signal, except during refill, represents the amount of material fed. These changes are totalled by the processor to give the actual total feed, in pounds. During refill the amount of material fed is computed by the processor from the reading of the feed rate meter and the time it takes to refill. When refill is completed the signal from the ADC 40 is again used to compute the total amount of material fed. The operators can compare the actual total feed, as displayed at 86, with the total feed commanded, as displayed at 84, to determine how the system is functioning and, if necessary, take corrective action.

A feed rate display device, such as a four digit meter, 88, for example, shows the actual feed rate in pounds per hour of the feeder assembly. Thus, the processor, as another operation thereof, receives the amplified scale weight signal from the ADC 52 and corrects this signal as pointed out hereinbefore, and then differentiates the signal with respect to time to produce a signal indicative of the present rate of feed. This can be visually compared to the desired feed rate as set by the input switch 68 to determine possible malfunctions in the system.

A scale weight display device, such as a three digit meter 90, for example, is provided to indicate the actual percentage of product remaining in the container 12 on the scale 22. Thus, the processor, as still another operation thereof, receives a signal from the ADC 40 corresponding to the weight on the scale 22 and computes the actual percentage of material remaining in the container 12. Next, there is provided, as another output of the processor 56, a three digit motor speed meter 92 which indicates the actual speed of the motor 18. That is, the processor receives a signal from a tachometer 93, indicating the speed of the motor 18, by a conductor 95 through a conventional analog-digital converter 97, and outputs a motor speed on meter 92. While this speed is usually relatively constant, it may vary to some extent over a long period of time. It is advantageous for the operator to know, as any sudden variations may indicate a blockage of material in the system.

In addition, there are provided operational and warning indicators, such as lights, buzzers, or the like, for example, fo purposes of keeping the operators informed. An underweight light 94 indicates when the actual feed rate, as indicated by the meter 88, falls below the underweight set point 72, and an overweight light 96 indicates when the actual feed rate exceeds the overweight set point 76. That is, when the actual feed rate falls below the line 74, FIG. 5, which is set by the underweight set point switch 72, the underweight light 94 is actuated, and when the actual feed rate is above the line 78, FIG. 5, which is set by the overweight set point switch 76, the overweight light 96 is actuated. Preferably, there is a preselected time delay period of from about 0 to about 3 minutes delay after the feed rate meter 88 indicates an overweight or an underweight condition before the warning lights are actuated. Light 98 shows when the system is in its refill mode, i.e. when the container 12 is being refilled. The light 100 indicates that the system is in its ACRILOK mode. This mode of operation will be explained more fully hereinafter. Run light 102 indicates that the system is in operation and standby light 104 indicates that the system power has been applied, but all machinery is stopped. The light 106 indicates that the bin 12 is in its low level condition.

A control output 108 from the processor 56 is applied to a digital-analog converter (DAC) 110. Any suitable type of DAC may be employed, such as a 10 bit Model AD7520L, as manufactured by Analog Devices, Inc., for example. In the DAC, the digital pulses are converted to an analog signal, which is applied to the tachometer 93 and an SCR motor control 112. Any suitable type of motor control may be employed such as Acrison, Inc.'s Model ACR100BTG, for example. This controller produces an output which is applied to the motor 18 to control the speed thereof, and thereby control the discharge rate of the material from the feeder assembly 10.

In operation, the operator must determine whether he wishes to operate in the volumetric mode or the gravimetric mode. If the volumetric mode is selected, then the operator sets the motor speed switch 67 to the desired motor speed. In this mode of operation, the output of the processor is a digital word conveyed by conductor 108 to the DAC 110. The DAC causes a voltage from 0 to 6 volts to appear on conductor 111 and the SCR motor control adjusts the speed of the DC motor 18 until the output of the tachometer 93 exactly equals the voltage on the conductor 111. While this mode of operation is desirable at certain times, it does not provide as high a degree of accuracy as the gravimetric mode and, consequently, the gravimetric mode is predominantly employed.

Figure 5:
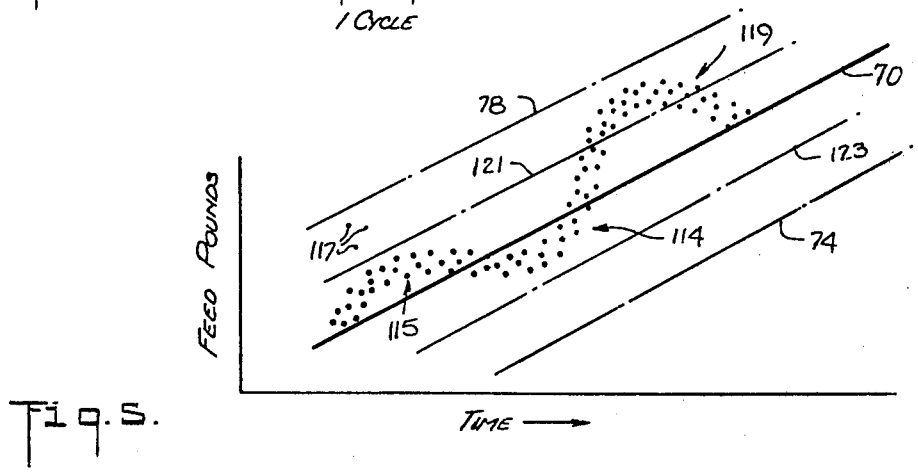
FIG. 5 is a graphical representation of the actual measured feed curve as compared to the desired feed curve.

In operation, when the operator sets the switch 62 to the gravimetric mode of operation, the operator then sets the feed rate switch 68 to the desired feed rate R (LBS./HR), which, as discussed hereinbefore, determines the slope of the feed curve or line 70, FIG. 5. The processor then computes the conversion time which may be, for example, T=(2.5) S/R in seconds where S is the scale weight as set by switch 66, R is the desired feed rate set by switch 68, and 2.5 is a constant which, when combined with S/R, produces the conversion time in seconds. The conversion time is the time for each cycle of operation, as shown in FIGS. 3 and 4, during which many samples of the input signal are taken and one calculation of feed rate is made. Next, the ramp offset 50 is energized which, as pointed out hereinbefore, limits the range of the output 54 of the amplifier 44 to between +5 volts and −5 volts. Initially, it sets said output at about +5 volts. Next, the processor starts the conversion time. The conversion time T, may, for example, be about 250 milliseconds. A plurality of samples are taken based on the input from the ADC 52, which may for example, be about 100 during each conversion time. The conversion time, T, or time to complete one cycle of operation is selected to be within the range of from about ¼ seconds minimum to a maximum of from about 100 to 200 seconds. During this cycle, the output from the amplifier 44 moves from about +5 volts to about −5 volts. Each sample is stored in memory. The samples, generally illustrated in FIG. 5 by dots, form the actual feed curve 114. One of the most important operations of the processor is to compute a regression analysis on these samples with respect to the conversion time T, and thence compute the RMS error on T.

FIG. 5 illustrates an upper 3 RMS error line at 121 and a lower 3 RMS error line at 123. If less than 20, for example, sample data points exceed 3 RMS error in either direction, as indicated at 115 in FIG. 5, regression on T is recomputed with the data points exceeding 3 RMS, as indicated at 117, excluded. Thence, the computed feed-rate, or, slope of the actual feed curve is compared with the slope of the desired or set point feed line, and a corresponding correction command is outputted at 108 to adjust the motor control 112, thereby to adjust the actual rate of discharge of the material from the feeder assembly 10. This time cycle of operation is continuously repeated to continuously adjust the motor control 112.

If more than 20, for example, sample data points exceed 3 RMS error in either direction, as indicated at 119 in FIG. 5, the system is changed into its ACRILOK mode. That is, the ACRILOK light 100 is energized and the output command 108 to the DAC 110 and motor control 112 is not updated, but continues in its present state. That is, the processor continues to receive sample signals from the ADC 52 and compute the regression analysis thereof, but no correction command is outputted at 108. The feed rate meter 88 is also locked at the last control data point. The feed system remains in a locked condition until in a subsequent time cycle of operation less than 20 data points exceed 3 RMS error, and then the system is returned to its normal operating mode and the correction command is again outputted at 108.

As still another operation of the processor, the total feed commanded, as indicated at 84, is compared to the actual total feed, as indicated at 86, periodically, such as every 5 or 10 minutes, for example. If there is a deviation exceeding predetermined limits, the processor modifies the aforementioned command output at 108 to gradually correct the actual feed to the total feed. This is programmed to take from about 5 minutes to about 10 minutes, thereby to avoid sharp fluctuations in the feed rate command, but nevertheless, obtain as close as possible the total feed selected over a long period of time.

A further operation of the processor, is to determine when the scale weight, as indicated by the meter 90, drops to a predetermined low level, as set by the low level switch 80, and then search for an "on rate" condition. That is, the output signal outputted at 88 is monitored until the difference between it and the feed rate switch 68 is less than a predetermined error limit. Thence, the system is changed into its refill mode wherein the output command 108 and feed rate meter 88 are not updated, but are retained in its present state, similar to its operation as described hereinbefore in connection with the ACRILOK mode. At the same time, a command is outputted to a refill circuit 120, which sends a signal to a refill controller 122 that controls the flow of material from a refill source 124 to the container 12. The controller 122 could be an AC motor when handling dry particulate material or could be a valve when handling liquids.

The system remains in the refill mode until the processor detects that the container 12 is refilled, as indicated by the scale weight meter 90, and as selected by the out of low level switch 82. At this time, the processor outputs a signal to the refill circuit 120 which, in turn, directs the refill controller 122 to discontinue refilling the container 12. The processor then returns the system to its normal operational mode.

FIGS. 9 to 14 are various flow charts of the computer 56. thus, FIG. 9 is a flow chart showing the wait subroutine, and FIG. 10 is a flow chart of the second interrupt subroutine, which is a display type subroutine. FIG. 11 is a flow chart of the derive subroutine wherein the normal conversion time is calculated. FIGS. 12A, 12B and 12C combine to form a flow chart of the main routine of the computer 56. FIGS. 13 and 14 are flow charts of the calculate and learn mode subroutines, respectively.

Initial conditions and assumptions are, as follows:

```
GRAV/VOL. = GRAV.
ON/OFF = OFF
AUTO/MAN./BY-PASS = AUTO
SCALE WEIGHT = 1000. lbs.
FEED RATE SET POINT = 200 LBS./HR.
INTO LOW LEVEL = 20%
OUT OF LOW LEVEL = 80%
MOTOR SPEED = 50%
ASSUME MAX. FEED RATE OF MACHINE = 2000 LBS./HR
REAL TIME CLOCK RATE = 1 KHZ (Clock causes interrupt)
Flags set by hardware:
            Grav. Flag
            Run Flag
            Learn Flag
         {  By-Pass Flag  }
         {  Man. Flag     }
            Reset total Flag
```

Number of Samples per slope calculation = 256.

The time between samples is chosen so that you have covered about 60% of the range of the ramp offset 50 for each slope calculation. The ramp offset is reset for each new slope calculation. Thus, the lower the set point the longer it takes to calculate the slope.

The following is a program with descriptive comments for carrying out the basic operations of the computer 56:

```
*B

*L   T/2

*T   T/2

END ?
          177554         OUT    =  177554  )
                                           )
          177552         DATA   =  177552  )
                                           )
          177554         OFFSET =  177554  )
                                           )
          177550         SET    =  177550  )
                                           )
          177550         LKS    =  177550  )
                                           )
          040200         ONEF   =  040200  )
                                           )
          040400         TWOF   =  040400  )
                                           )
          040700         SIXF   =  040700  )
                                           )
          000004         WAITR  =  4       )
                                           )
          000011         READ   =  11      ) DEFINITIONS OF
                                           )
          000012         WRITE  =  12      ) CONSTANTS, ADDRESSES
                                           )
          000000         R0=%0             ) AND REGISTERS.
                                           )
          000001         R1 = %1           )
                                           )
          000002         R2 =%2            )
                                           )
          000003         R3 =%3            )
                                           )
          000004         R4 =%4            )
                                           )
          000005         R5 =%5            )
                                           )
          000006         R6 =%6            )
                                           )
          000006         SP =%6            )
                                           )
          000007         PC =%7            )
```

```
         057452      $ADR=57452    )
         060206      $CHR=60206    )
         063500      $DVR=63500    )
         061664      $GCO=61664    )
         064146      $IR=64146     ) LINKS TO FLOATING POINT
         064232      $MLI=64232    ) MATH PACKAGE (FPMP-WRITTEN
         064412      $MLR=64412    ) BY D.E.C.)
         064772      $NGR=64772    )
         065146      $POLSH=65146  )
         060264      $RC1=60264    )
         065024      $R1=65024     )
         057446      $SBR=57446    )
         000174      .=174
000174   050722      .WORD INT     ) SET UP 1KHZ. CLOCK INTERRUPT
000176   000340      .WORD 000340  ) VECTOR
         050000      .=50000
050000   010767      START: MOV PC, STKST  )
         003642                            )
050004   016706             MOV STKST, SP  ) -; STACK POINTER IS
         003636                            )    NOW POINTING
050010   005746             TST (SP) -     )    TO STKST
050012   013700             MOV @ #177552, R0
         177552
050016   052767             BIS #2, SET    );INITIALIZE
         000002                            ) OFFSET
         127524                            ) VOLTAGE TO
050024   012767             MOV #177777,OFFSET ) ZERO (IN
                                           ) COMPLEMENT
                                           ) FORM
         177777                            )
         127522                            );INITIALIZE
050032   005067             CLR SET        ) CONTROL
         127512                            ) VOLTAGE TO
         RQ @GE 001                        ) ZERO(IN
050036   012767             MOV #177777,OFFSET ) COMPLEMENT
                                           ) FORM)
         177777
         127510                            )INITIALIZE
050044   000004             IOT            )TELETYPE
050046   000000             .WORD 0        )THROUGH
050050   002                .BYTE 2,0      )IOX (IOX IS
                                           )WRITTEN BY
                                           )D.E.C.)
```

| | | | |
|---|---|---|---|
| 050051 | 000 | | |
| 050052 | 000004 | IOT | ) SETS UP |
| | | | ) CONTROL P |
| 050054 | 050060 | .WORD ASK | ) RETURN |
| | | | ) ADDRESS |
| 050056 | 003 | .BYTE 3,0 | ) |
| 050057 | 000 | | |
| 050060 | 012701 ASK: | MOV #TABLE1, R1; GET ADDRESS OF TABLE OF QUESTIONS | |
| | 050400 | | |
| 050064 | 012767 | MOV #9., LOOP; SET UP LOOP FOR NINE QUESTIONS | |
| | 000011 | | |
| | 003552 | | |
| 050072 | 012700 | MOV #PTABLE,R0;GET ADDRESS OF TABLE CONTAINING POINTERS TO THE 9 QUESTIONS | |
| | 050356 | | |
| 050076 | 012067 MORE: | MOV (R0)+,WBUFFER | |
| | 000002 | | |
| 050102 | 000004 | IOT | ) |
| | | | ) PRINT THE |
| 050104 | 000000 WBUFFER: | .WORD 0 | ) QUESTION |
| | | | ) |
| 050106 | 012 | .BYTE WRITE, 1 | ) |
| 050107 | 001 | | |
| 050110 | 000004 | IOT | ) |
| | | | ) GET A REPLY |
| 050112 | 050250 | .WORD BUFFER | ) |
| | | | ) |
| 050114 | 011 | .BYTE READ,0 | ) |
| 050115 | 000 | | |
| 050116 | 0004 WAITT: | IOT | ) WAIT UNTIL |
| | | | ) REPLY IS |
| 050120 | 050116 | .WORD WAITT | ) GIVEN BY |
| | | | ) OPERATOR AT |
| 050122 | 004 | .BYTE WAITR,0 | ) TTY. |
| 050123 | 000 | | |
| 050124 | 012746 | MOV #BUFFER+6,(SP)-; PUT ADDRESS OF REPLY ON STACK | |
| | 050256 | | |
| 050130 | 016746 | MOV BUFFER +4,(SP)-; PUT LENGTH OF REPLY ON STACK | |
| | 000120 | | |
| 050134 | 162716 | SUB #2, (SP) | |
| | 000002 | | |
| 050140 | 005046 | CLR (SP)- ) | |
| | | ) FREE FORMAT CONVERSION | |
| 050142 | 005046 | CLR (SP)- ) | |
| 050144 | 004767 | JSR PC,$RCI; CONVERT REPLY TO FLOATING POINT | |
| | 010114 | | |
| 050150 | 012621 | MOV (SP)+,(R1)+) | |
| | | ) STORE REPLY IN | |
| 050152 | 012621 | MOV (SP)+,(R1)+)TABLE 1. | |

```
050154   005367            DEC LOOP
         003464
050160   001346            BNE MORE
050162   005046            CLR (SP)-
050164   012746            MOV #042722,(SP)-   ) PUT FLTING
         042722                                  PT. 1680 ON
                                                 THE STACK
         RQ@GE    002
050170   012701            MOV #TABLE 1+14,R1
         050414
050174   014146            MOV (R1)-, (SP)-   )
050176   014146            MOV (R1)-, (SP)-   ) CALCULATE
050200   014146            MOV (R1)-, (SP)-   ) # SAMPLES/SEC.
050202   014146            MOV (R1)-, (SP)-   )
050204   004467            JSR R4, SPOLSH     )
         014736                               )
050210   063500            SDVR               )
050212   050214            .WORD .+2
050214   011667            MOV (SP), HOLD8    )
         003450                               )STORE #SAMPLES/
                                              )  SEC
050220   016667            MOV 2(SP), HOLD9   )
         000002
         003444
050226   004467            JSR R4, SPOLSH     )
         014714                               ) DIVIDE SAMPLES/
                                              ) SEC BY 1680 TO
                                              ) GIVE THE # OF
050232   063500            SDVR               ) INTERRUPTS PER
                                              ) SAMPLE
050234   065024            SH1                )
050236   050240            .WORD .+2
050240   012667            MOV (SP)+,INTSAM; STORE RESULT.
         003430
050244   000167            JMP INIT; GO TO THE INITIALIZATION
                                    SECTION
         002126
050250   000100            BUFFER: 100        )
050252   000000            0                  ) BUFFER FOR
                                              ) REPLYS TO
050254   000000            0                  ) QUESTIONS
         050356            .=.+100
050356   050450   NTABLE:  TABLE              )
050360   050472            TABLE2             )
050362   050506            TABLE3             )
050364   050522            TABLE4             )
                                              )POINTERS TO
050366   050544            TABLE5             )THE QUESTIONS
050370   050570            TABLE6             )
```

```
Ø5Ø372  Ø5Ø6Ø4           TABLE7               )
Ø5Ø374  Ø5Ø63Ø           TABLE8               )
Ø5Ø376  Ø5Ø662           TABLE9               )
        Ø5Ø45Ø  TABLE1:  .=.+5Ø
Ø5Ø45Ø  ØØØØ14  TABLE:   TABLE2-TABLE-6
Ø5Ø452  ØØØØØØ           Ø
Ø5Ø454  ØØØØ14           TABLE2-TABLE-6        THE QUESTIONS
Ø5Ø456  Ø15              .BYTE 15,12
Ø5Ø457  Ø12
Ø5Ø46Ø  1Ø6              .ASCII 'FEED V/S='; VOLTS/SECOND
                                              FEED RATE
Ø5Ø461  1Ø5
Ø5Ø462  1Ø5
Ø5Ø463  1Ø4
Ø5Ø464  Ø4Ø
Ø5Ø465  126
Ø5Ø466  Ø57
Ø5Ø467  123
Ø5Ø47Ø  Ø75
        Ø5Ø472  .EVEN
Ø5Ø472  ØØØØØ6  TABLE2:  TABLE3-TABLE2-6
Ø5Ø474  ØØØØØØ           Ø
Ø5Ø476  ØØØØØ6           TABLE3-TABLE2-6
Ø5Ø5ØØ  124              .ASCII 'TIME='; SMALL SAMPLE TIME
                                         IN SECONDS
Ø5Ø5Ø1  111
Ø5Ø5Ø2  115
Ø5Ø5Ø3  1Ø5
Ø5Ø5Ø4  Ø75
        Ø5Ø5Ø6           .EVEN
Ø5Ø5Ø6  ØØØØØ6  TABLE3:  TABLE4-TABLE3-6
Ø5Ø51Ø  ØØØØØØ           Ø
Ø5Ø512  ØØØØØ6           TABLE4-TABLE3-6
Ø5Ø514  Ø43              .ASCII '#SAM='; #SAMPLES PER
                                         SMALL SAMPLE TIME
Ø5Ø515  123
Ø5Ø516  1Ø1
Ø5Ø517  115
Ø5Ø52Ø  Ø75
        Ø5Ø522  .EVEN
Ø5Ø522  ØØØØ14  TABLE4:  TABLE5-TABLE4-6
Ø5Ø524  ØØØØØØ           Ø
Ø5Ø526  ØØØØ14           TABLE5-TABLE4-6
```

| | | | |
|---|---|---|---|
| 050530 | 105 | | .ASCII 'ERR BND V/S='; SMALL SAMPLE ERROR BAND IN VOLT/SECOND |
| 050531 | 122 | | |
| 050532 | 122 | | |
| 050533 | 040 | | |
| 050534 | 102 | | |
| 050535 | 116 | | |
| 050536 | 104 | | |
| 050537 | 040 | | |
| 050540 | 126 | | |
| 050541 | 057 | | |
| 050542 | 123 | | |
| 050543 | 075 | | |
| | 050544 | .EVEN | |
| 050544 | 000016 | TABLE5: | TABLE6-TABLE5-6 |
| 050546 | 000000 | | 0 |
| 050550 | 000016 | | TABLE6-TABLE5-6 |
| 050552 | 043 | | .ASCII '#SM SAM/LARGE='; # OF SMALL SAMPLES PER LARGE SAMPLE TIME. |
| 050553 | 123 | | |
| 050554 | 115 | | |
| 050555 | 040 | | |
| 050556 | 123 | | |
| 050557 | 101 | | |
| 050560 | 115 | | |
| 050561 | 057 | | |
| 050562 | 114 | | |
| 050563 | 101 | | |
| | RQ@GE | 004 | |
| 050564 | 122 | | |
| 050565 | 107 | | |
| 050566 | 105 | | |
| 050567 | 075 | | |
| | 050570 | .EVEN | |
| 050570 | 000006 | TABLE6: | TABLE7-TABLE6-6 |
| 050572 | 000000 | | 0 |
| 050574 | 000006 | | TABLE7-TABLE6-6 |
| 050576 | 105 | | .ASCII 'ERR K='; OUTPUT ERROR CONSTANT "K" THIS IS SYSTEM GAIN. |

```
050577      122
050600      122
050601      040
050602      113
050603      075
            050604      .EVEN
050604      000016      TABLE7:     TABLE8-TABLE7-6
050606      000000                  0
050610      000016                  TABLE8-TABLE7-6
050612      043                     .ASCII '#SM SAM B4 SW=' ;# OF SMALL
                                                            SAMPLES
                                                            BEFORE
                                                            SWITCHING
050613      123
050614      115
050615      040
050616      123
050617      101
050620      115
050621      040
050622      102
050623      064
050624      040
050625      123
050626      127
050627      075
            050630      .EVEN
050630      000024      TABLE8:     TABLE9-TABLE8-6
050632      000000                  0
050634      000024                  TABLE9-TABLE8-6
050636      123                     .ASCII 'STARTUP ERR BND V/S='
050637      124
050640      101
050641      122
050642      124
050643      125
050644      120
050645      040
050646      105
050647      122
050650      122
050651      040
050652      102
```

```
Ø5Ø653        116
              RQ@GE     ØØ5
Ø5Ø654        1Ø4
Ø5Ø655        Ø4Ø
Ø5Ø656        126
Ø5Ø657        Ø57
Ø5Ø66Ø        123
Ø5Ø661        Ø75
              Ø5Ø662              .EVEN
Ø5Ø662        ØØØØ24   TABLE9:    TABLEZ-TABLE9-6
Ø5Ø664        ØØØØØØ              Ø
Ø5Ø666        ØØØØ24   TABLEZ     TABLEZ-TABLE9-6
Ø5Ø67Ø        Ø43      .ASCII     '/SM SAM IN STARTUP'
Ø5Ø671        123
Ø5Ø672        115
Ø5Ø673        Ø4Ø
Ø5Ø674        123
Ø5Ø675        1Ø1
Ø5Ø676        115
Ø5Ø677        Ø4Ø
Ø5Ø7ØØ        111
Ø5Ø7Ø1        116
Ø5Ø7Ø2        Ø4Ø
Ø5Ø7Ø3        123
Ø5Ø7Ø4        124
Ø5Ø7Ø5        1Ø1
Ø5Ø7Ø6        122
Ø5Ø7Ø7        124
Ø5Ø71Ø        125
Ø5Ø711        12Ø
Ø5Ø712        Ø75
              Ø5Ø714   .EVEN
Ø5Ø714        ØØØ      TABLEZ:    .BYTE Ø
              Ø5Ø716              .EVEN
Ø5Ø716        ØØØ167   LINK:      JMP RESET
              ØØ1212
Ø5Ø722        ØØ5737   INT:       TST @#177552; START OF INTERRUPT
                                                SERVICE.
              177552
Ø5Ø726        ØØ5367              DEC INTS       )
              ØØ2556                             ) IS IT TIME TO
                                                 )    SAMPLE?
Ø5Ø732        ØØ14Ø1              BEQ SAMPLE     )
```

| | | | | |
|---|---|---|---|---|
| 050734 | 000002 | | RTI | |
| 050736 | 004767 | SAMPLE: | JSR PC, SAVE | |
| | 001366 | | | |
| 050742 | 005267 | | INC SET; START A/D CONVERSION | |
| | 126602 | | | |
| 050746 | 105767 | CK: | TSTB SET | |
| | 126576 | | | |
| 050752 | 100375 | | BPL CK | |
| 050754 | 016700 | | MOV DATA, R0; GET THE A/D OUTPUT | |
| | 126572 | | | |
| 050760 | 005100 | | COM R0 | |
| | RQCGE | 006 | | |
| 050762 | 016767 | | MOV INTSA, INTS; RESET # INTERRUPTS/SAMPLE. | |
| | 002524 | | | |
| | 002520 | | | |
| 050770 | 022700 | | CMP #980.,R0 | ) IS THE A/D OUT-<br>) PUT GREATER THAN<br>) 9 VOLTS? IF<br>) YES RESET. |
| | 001724 | | | |
| 050774 | 003750 | | BLE LINK | ) |
| 050776 | 060067 | | ADD R0,Y+2 | ) SUM THE Y VALUE<br>) FOR THE<br>) REGRESSION. |
| | 002514 | | | |
| 051002 | 005567 | | ADC Y | |
| | 002506 | | | |
| 051006 | 016701 | | MOV X, R1 | ) MULTIPLY THE X<br>) BY THE Y<br>) |
| | 002506 | | | |
| 051012 | 004767 | | JSR PC,MULTY | ) |
| | 001062 | | | |
| 051016 | 060167 | | ADD R1,XY+2 | )<br>) |
| | 002514 | | | |
| 051022 | 005567 | | ADC XY | ) SUM THE XY VALUE<br>) FOR THE<br>) REGRESSION. |
| | 002506 | | | |
| 051026 | 060067 | | ADD R0,XY | )<br>) |
| | 002502 | | | |
| 051032 | 005367 | | DEC X; REDUCE X VALUE BY 1 | |
| | 002462 | | | |
| 051036 | 001402 | | BEQ CALC; IF X=0 IT IS TIME TO CALCULATE THE SLOPE | |
| 051040 | 004767 | | JSR PC,RESTORE | |
| | 001312 | | | |
| 051044 | 016767 | CALC: | MOV N,X; RESET THE X VALUE | |
| | 002500 | | | |
| | 002446 | | | )<br>) |

| | | | | |
|---|---|---|---|---|
| 051052 | 016767 | | MOV Y,YC | ) |
| | 002436 | | | ) STORE THE |
| | 002464 | | | ) ΣY |
| | | | | ) |
| 051060 | 016767 | | MOV Y+2,YC+2 | ) |
| | 002432 | | | |
| | 002460 | | | |
| 051066 | 016767 | | MOV XY,XYC | ) |
| | 002442 | | | ) |
| | 002444 | | | ) STORE THE ΣX |
| | | | | ) |
| 051074 | 016767 | | MOV XY+2,XYC+2 | ) |
| | 002436 | | | |
| | 002440 | | | |
| 051102 | 005067 | | CLR XY | ) |
| | 002426 | | | ) |
| 051106 | 005067 | | CLR XY+2 | ) RESET ΣXY AND |
| | 002424 | | | ) ΣY FOR NEXT |
| | | | | ) SAMPLE PERIOD. |
| 051112 | 005067 | | CLR Y | ) |
| | 002376 | | | ) |
| 051116 | 005067 | | CLR Y+2 | ) |
| | 002374 | | | |
| 051122 | 016746 | | MOV N1+2,(SP)- | ) |
| | 002426 | | | ) PUT # SAMPLES |
| | | | | ) ON THE STACK. |
| | RQRGE | 007 | | ) |
| 051126 | 016746 | | MOV N1,(SP)- | ) |
| | 002420 | | | |
| 051132 | 016700 | | MOV XYC, R0 | ) |
| | 002402 | | | ) |
| 051136 | 016701 | | MOV XYC+2,R1 | ) |
| | 002400 | | | ) CONVERT ΣXY TO |
| | | | | ) A FLOATING POINT |
| 051142 | 004767 | | JSR PC,DFLOAT | ) # AND PUT IT ON |
| | 000620 | | | ) THE STACK. |
| 051146 | 004467 | | JSR R4, $POLSH | ) |
| | 013774 | | | ) |
| 051152 | 064412 | | $MLR | ) (#SAMPLES) x |
| 051154 | 051156 | | .WORD .+2 | ) ΣXY |
| 051156 | 016746 | | MOV X1+2,(SP)- | ) |
| | 002350 | | | ) PUT ΣX ON |
| | | | | ) STACK |
| 051162 | 016746 | | MOV X1,(SP)- | |
| | 002342 | | | |
| 051166 | 016700 | | MOV YC, R0 | ) |
| | 002352 | | | ) |
| | | | | ) CONVERT ΣY TO |

| | | | |
|---|---|---|---|
| Ø51172 | Ø167Ø1 | MOV YC+2,R1 | ) FLOATING POINT |
| | ØØ235Ø | | ) AND PUT IT ON |
| | | | ) THE STACK. |
| | | | ) |
| Ø51176 | ØØ4767 | JSR PC,DFLOAT | ) |
| | ØØØ564 | | |
| Ø512Ø2 | ØØ4467 | JSR R4,$POLSH | ) |
| | Ø1374Ø | | ) GET (#SAMPLES) |
| | | | ) ($\Sigma XY$)-$\Sigma X\Sigma Y$ |
| Ø512Ø6 | Ø64412 | $MLR | ) |
| Ø5121Ø | Ø57446 | $SBR | ) |
| Ø51212 | Ø51214 | .WORD .+2 | ) |
| Ø51214 | Ø16746 | MOV N1+2,(SP)- | ) |
| | ØØ2334 | | ) PUT # SAMPLES |
| | | | ) ON THE STACK. |
| Ø5122Ø | Ø16746 | MOV N1,(SP)- | ) |
| | ØØ2326 | | |
| Ø51224 | Ø16746 | MOV X2+2,(SP)- | ) |
| | ØØ2276 | | ) PUT $\Sigma X^2$ ON |
| | | | ) STACK. |
| Ø5123Ø | Ø16746 | MOV X2,(SP)- | ) |
| | ØØ227Ø | | |
| Ø51234 | ØØ4467 | JSR R4,$POLSH | ) |
| | Ø137Ø6 | | ) GET (#SAMPLES) |
| | | | ) ($\Sigma X^2$) |
| Ø5124Ø | Ø64412 | $MLR | ) |
| Ø51242 | Ø51244 | .WORD .+2 | |
| Ø51244 | Ø16746 | MOV X1+2,(SP)- | ) |
| | ØØ2262 | | ) PUT $\Sigma X$ ON |
| | | | ) STACK. |
| Ø5125Ø | Ø16746 | MOV X1,(SP)- | ) |
| Ø51254 | Ø16746 | MOV X1+2,(SP)- | ;$\Sigma X$ ON STACK AGAIN |
| | ØØ2252 | | |
| Ø5126Ø | Ø16746 | MOV X1,(SP)- | |
| | ØØ2244 | | |
| Ø51264 | ØØ4467 | JSR R4,$POLSH | ) |
| | Ø13656 | | ) |
| Ø5127Ø | Ø64412 | $MLR | ) |
| | RQ@GE Ø1Ø | | )(#SAMPLES)($\Sigma XY$)($\Sigma X\Sigma Y$)= |
| | | | )(#SAMPLES)($\Sigma X^2$)($\Sigma X\Sigma X$) |
| Ø51272 | Ø57446 | $SBR | ) SLOPE |
| Ø51274 | Ø635ØØ | $DVR | ) |
| Ø51276 | Ø64772 | $NGR | ) |
| Ø513ØØ | Ø513Ø2 | .WORD .+2 | ) |
| Ø513Ø2 | Ø16746 | MOV SAMSØ1+2,(SP)-) | |
| | ØØ2252 | | ) PUT # SAMPLES/ |
| | | | ) SECOND ON |
| | | | ) STACK |
| Ø513Ø6 | Ø16746 | MOV SAMSØ1,(SP)- | ) |
| | ØØ2244 | | |
| Ø51312 | ØØ4467 | JSR R4,$POLSH | |
| | Ø1363Ø | | |

```
Ø51316    Ø64412                 $SQR
Ø51320    Ø51322                 .WORD .+2
Ø51322    ØØ5Ø46                 CLR (SP)-
Ø51324    Ø12746                 MOV #Ø41710,(SP)- ;FLOATING POINT
                                                    100
          Ø41710
Ø51330    ØØ4467                 JSR R4, $POLSH
          Ø13612
Ø51334    Ø635ØØ                 $DVR ; VOLT = ΔCPS × AMPLE × 1
                                        SEC    SEC         100
Ø51336    Ø51340                 .WORD .+2
Ø51340    Ø11667                 MOV (SP),TEMP        )
                                                      ) STORE V/S FOR
          ØØ2216                                      ) LATER USE.
                                                      )
Ø51344    Ø16667                 MOV 2(SP),TEMP+2     )
          ØØØØØ2
          ØØ2212
Ø51352    Ø16746                 MOV PREV+2,(SP)-     )
                                                      ) PUT PREVIOUS
          ØØ2212                                      ) V/S ON STACK
                                                      )
Ø51356    Ø16746                 MOV PREV,(SP)-       )
          ØØ22Ø4
Ø51362    ØØ4467                 JSR R4,$POLSH        )
                                                      )
          Ø13560                                      )PREV-CURRENT
                                                      )V/S.
Ø51366    Ø57446                 $SBR                 )
Ø51370    Ø51372                 .WORD .+2
Ø51372    Ø32716                 BIT #1ØØØØØ,(SP)     )
                                                      )
          1ØØØØØ                                      )
                                                      )
Ø51376    ØØ14Ø4                 BEQ OVR              ) GET THE
                                                      ) ABSOLUTE VALUE
Ø514ØØ    ØØ4467                 JSR R4, $POLSH       )|PREV V/S-
          Ø13542                                      ) CURRENT V/S|
                                                      )
Ø514Ø4    Ø64772                 $NGR                 )
Ø514Ø6    Ø51410                 .WORD .+2
Ø51410    ØØ5767    OVR:         TST ERRSW            )
                                                      ) LARGE OR SMALL
          ØØ2156                                      ) ERROR BAND?
                                                      )
Ø51414    ØØ1410                 BEQ LARGE            )
Ø51416    ØØ5367                 DEC ERRSW-SMALL--DECREASE # SMALL
                                                 SAMPLES BEFORE
                                                 SWITCHING ERROR
                                                 BANDS.
          ØØ215Ø
Ø51422    ØØ14Ø5                 BEQ LARGE
Ø51424    Ø16746                 MOV SE+2,(SP)-       )
                                                      ) MOVE SMALL
          ØØ215Ø                                      ) ERROR BAND
                                                      ) ONTO STACK.
Ø51430    Ø16746                 MOV SE,(SP)-
          ØØ2142
```

```
051434   000404              BR TSTE; TEST FOR ACRILOK
         RQ0GE      011

051436   016746   LARGE:  MOV LE+2,(SP)-   )
         002142                            ) MOVE LARGE
                                           ) ERROR BAND
051442   016746           MOV LE,(SP)-     ) ONTO STACK.
         002134                            )

051446   004467   TSTE:   JSR R4,$POLSH    )
         013474                            )
                                           ) COMPARE
051452   060206           $CMR             ) PREV V/S-
                                           ) CURRENT V/S
051454   051456           .WORD .+2        ) TO ALLOWABLE
                                           ) ERROR IN V/S
051456   003402           BLE .+6          ) AND JMP IF TOO
                                           ) LARGE.
051460   000167           JMP ACRILOCK     )
         000630

051464   016767           MOV TEMP,PREV;   )THIS IS .+6
         002072                            )YOU ARE WITHIN
                                           ) THE ERROR BAND
         002074                            )(STORE THE FEED
                                           )RATE IN V/S
051472   016767           MOV TEMP+2,PREV+2)
         002066                            )
         002070

051500   005267           INC UPDAT;SET THE FLAG TO INDICATE
                            A NEW FEED RATE HAS JUST
                            BEEN CALCULATED
         002002

051504   005767           TST LOS          ) ARE WE USING
         002102                            ) LARGE OR SMALL
                                           ) SAMPLES?
051510   001451           BEQ LAR          )

051512   005367           DEC LOS;DECREMENT # OF SMALL
                            SAMPLES.
         002074

051516   016746   UPDATE: MOV K+2,(SP)-    )
         002076                            ) PUT OUTPUT
                                           ) CONSTANT
051522   016746           MOV K,(SP)-      ) (SYSTEM GAIN)
         002070                            ) ON THE STACK.

051526   016746           MOV FR+2,(SP)-   )
         002072                            ) PUT DESIRED
                                           ) FEED RATE ON
051532   016746           MOV FR,(SP)-     ) THE STACK.
         002064

051536   016746           MOV PREV+2,(SP)- )
         002026                            ) PUT CURRENT
                                           ) FEED RATE ON
051542   016746           MOV PREV,(SP)-   ) THE STACK.
         002020

051546   004467           JSR R4,$POLSH    )
         013374                            )
```

```
Ø51552   Ø57446           $SBR              ) (CURRENT-DESIR-
Ø51554   Ø64412           $SMLR             ) ED)K + CONWOR
Ø51556   Ø65Ø24           $RI               ) PREVIOUS MOTOR
                                            ) SPEED.
Ø5156Ø   Ø51562           .WORD .+2         )
Ø51562   Ø62667           ADD (SP)+,CONWOR  )
         ØØ2Ø4Ø
Ø51566   Ø26727           CMP CONWOR,#2ØØØ  )
         ØØ2Ø34                             )
         ØØ2ØØØ                             ) IF RESULT IS
                                            ) GREATER THAN
                                            ) 2ØØØ (6V"
Ø51574   1ØØ4Ø3           BMI CNTU          ) OUTPUT OF D/A)
Ø51576   Ø12767           MOV#1777,CONWOR   ) MAKE IT=2ØØØ;
                                            ) I.E., LIMIT
         ØØ1777                             ) RESULT TO 6 VOLTS
         ØØ2Ø22                             )

RQGGE   Ø12

Ø516Ø4   Ø42767           CNTU:BIC#Ø2,SET; GET SET TO UPDATE MOTOR
                                         SPEED.
         ØØØØØ2
         125736

Ø51612   ØØ5167           COM CONWOR        )
         ØØ2Ø1Ø                             ) THE D/A USES
                                            ) NEGATIVE LOGIC
Ø51616   Ø16767           MOV CONWOR, OUT   )
         ØØ2ØØ4
         125736

Ø51624   ØØ5167           COM CONWOR; BUT THE PROGRAMMER
                                      PREFERS TO THINK
         ØØ1776                       POSITIVE.

Ø5163Ø   ØØ4767           JSR PC,RESTORE;GO BACK TO WHERE
                                         YOU WERE BEFORE
                                         BEING RUDELY
                                         INTERRUPTED.
         ØØØ522

Ø51634   Ø16746   LAR:    MOV PREV+2,(SP)-  )
         ØØ173Ø                             )
Ø5164Ø   Ø16746           MOV PREV,(SP)-    ) IF YOU ARE
                                            ) CALLING FOR
         ØØ1722                             ) LARGE SAMPLES,
                                            ) I.E. AN AVERAGE
Ø51644   Ø16746           MOV AVG+2, (SP)-  ) OF THE V/S
                                            ) CALCULATIONS,
         ØØ1762                             ) THEN YOU ARE
                                            ) HERE. COMPUTE
Ø5165Ø   Ø16746           MOV AVG, (SP)-    ) THE RUNNING
                                            ) AVERAGE.
         ØØ1754                             )

Ø51654   ØØ4467           JSR R4,SPOLSH     )
         Ø13266                             )
Ø5166Ø   Ø57452           $ADR              )
Ø51662   Ø51664           .WORD .+2         )
Ø51664   ØØ5767           TST SSLST         )
```

|         |        |        |                       |                                  |
|---------|--------|--------|-----------------------|----------------------------------|
|         | 001744 |        |                       | ) IF YOU HAVE                    |
| 051670  | 001411 |        | BEQ CALL              | ) ENOUGH V/S                     |
| 051672  | 005367 |        | DEC SSLST             | ) CALCULATIONS                   |
|         |        |        |                       | ) USE THE                        |
|         |        |        |                       | ) AVERAGE; I.E.                  |
|         | 001736 |        |                       | ) JUMP TO CALL.                  |
| 051676  | 001406 |        | BEQ CALL              | )                                |
| 051700  | 012667 |        | MOV (SP)+,AVG         | )                                |
|         | 001724 |        |                       | ) YOU DON'T HAVE                 |
|         |        |        |                       | ) ENOUGH V/S                     |
| 051704  | 012667 |        | MOV (SP)+,AVG+2       | ) CALCULATIONS.                  |
|         |        |        |                       | ) RETURN TO WHERE                |
|         | 001722 |        |                       | ) YOU WERE BEFORE                |
|         |        |        |                       | ) THE INTERRUPT.                 |
| 051710  | 004767 |        | JSR PC, RESTORE       | )                                |
|         | 000442 |        |                       |                                  |
| 051714  | 016767 | CALL:  | MOV SSLSTI,SSLST      | )                                |
|         | 001716 |        |                       | )                                |
|         | 001712 |        |                       | ) RESET #SMALL                   |
|         |        |        |                       | ) SAMPLES PER                    |
| 051722  | 016746 |        | MOV SSLSTR+2,(SP)-    | ) LARGE SAMPLE                   |
|         |        |        |                       | ) TIME.                          |
|         | 001714 |        |                       |                                  |
| 051726  | 016746 |        | MOV SSLSTR,(SP)-      | ;PUT # SMALL                     |
|         |        |        |                       | SAMPLES/LARGE SAM.               |
|         |        |        |                       | ON STACK.                        |
|         | 001706 |        |                       |                                  |
| 051732  | 004467 |        | JSR R4,$POLSH         | )                                |
|         | 013210 |        |                       | ) GET THE AVER.                  |
|         |        |        |                       | ) OF THE SMALL                   |
| 051736  | 063500 |        | $DVR                  | ) SAMPLES COM-                   |
|         |        |        |                       | ) PRISING THE                    |
| 051740  | 051742 |        | .WORD .+2             | ) LARGE SAMPLE.                  |
| 051742  | 012667 |        | MOV (SP)+,PREV        | )                                |
|         | 001620 |        |                       | ) STORE THE                      |
|         |        |        |                       | ) AVERAGE.                       |
| 051746  | 012667 |        | MOV (SP)+,PREV+2      | )                                |
|         | 001616 |        |                       |                                  |
|         | RQ@GE  | 013    |                       |                                  |
| 051752  | 005067 |        | CLR AVG               | )                                |
|         | 001652 |        |                       | ) RESET THE AVG.                 |
| 051756  | 005067 |        | CLR AVG+2             | )                                |
|         | 001650 |        |                       |                                  |
| 051762  | 000167 |        | JMP UPDATE            | ;REFRESH THE MOTOR               |
|         |        |        |                       |  SPEED.                          |
|         | 177530 |        |                       |                                  |
| 051766  | 012667 | DFLOAT:| MOV (SP)+,RTRN        | )                                |
|         | 000104 |        |                       | )                                |
| 051772  | 005046 |        | CLR (SP)-             | )                                |
| 051774  | 005046 |        | CLR -(SP)             | )                                |
| 051776  | 005700 |        | TST R0                | )                                |
| 052000  | 003007 |        | BGT P0527             | )                                |
| 052002  | 002403 |        | BLT OVE27             | )                                |

| | | | | |
|---|---|---|---|---|
| 052004 | 005701 | | TST R1 | |
| 052006 | 001432 | | BEQ ZER27 | |
| 052010 | 000403 | | BR POS27 | |
| 052012 | 005401 | OVE27: | NEG R1 | |
| 052014 | 005400 | | NEG R0 | |
| 052016 | 005601 | | SBC R1 | |
| 052020 | 006146 | POS27: | ROL -(SP) | |
| 052022 | 000241 | | CLC | |
| 052024 | 012702 | | MOV #240,R2 | |
| | 000240 | | | |
| 052030 | 006101 | NOM27: | ROL R1 | |
| 052032 | 006100 | | ROL R0 | |
| 052034 | 103402 | | BCS NOD27 | ) DOUBLE |
| 052036 | 005302 | | DEC R2 | ) PRECISION |
| 052040 | 000773 | | BR NOM27 | ) INTEGER TO |
| 052042 | 000301 | NOD27: | SWAB R1 | ) FLOATING POINT |
| 052044 | 110166 | | MOVB R1,4(SP) | ) SUBROUTINE |
| | 000004 | | | |
| 052050 | 110066 | | MOVB R0,5(SP) | |
| | 000005 | | | |
| 052054 | 105000 | | CLRB R0 | |
| 052056 | 150200 | | BISB R2,R0 | |
| 052060 | 000300 | | SWAB R0 | |
| 052062 | 006026 | | ROR (SP)+ | |
| 052064 | 006000 | | ROR R0 | |
| 052066 | 006066 | | ROR 2(SP) | |
| | 000002 | | | |
| 052072 | 010016 | | MOV R0,(SP) | |
| 052074 | 000137 | ZER27: | JMP @(PC)+ | |
| 052076 | 000000 | RTRN: | 0 | |
| 052100 | 005002 | MULTY: | CLR R2 | ) INTEGER MULTIPLY |
| 052102 | 005004 | | CLR R4 | ) SUBROUTINE |
| 052104 | 012703 | | MOV #16.,R3 | ) 16BIT X 16BIT= |
| | 000020 | | | ) 32 BIT RESULT. |
| 052110 | 006200 | | ASR R0 | |
| 052112 | 103001 | MR: | BCC .+4 | |
| 052114 | 060102 | | ADD R1,R2 | |
| | RQCGE | 014 | | |
| 052116 | 006002 | | ROR R2 | ) INTEGER |
| 052120 | 006000 | | ROR R0 | ) MULTIPLY |
| 052122 | 005303 | | DEC R3 | ) SUBROUTINE |
| 052124 | 001372 | | BNE MR | ) 16BIT×16BIT= |

| | | | |
|---|---|---|---|
| 052126 | 010001 | MOV R0,R1 | ) 32BIT RESULT. |
| 052130 | 010200 | MOV R2,R0 | ) (CONT'D.) |
| 052132 | 000207 | RTS PC | ) |
| 052134 | 052767 | RESET:BIS#2,SET | ) |
| | 000002 | | ) WHEN A/D OUTPUT |
| | 125406 | | ) RAMPS GREATER |
| 052142 | 062767 | ADD#17,OFFDAC | ) THAN 9V LIMIT |
| | 000017 | | ) RESET IT CLOSE |
| | 000136 | | ) TO ZERO BY |
| 052150 | 016767 | MOV OFFDAC,OFFSET | ) CHANGING THE |
| | 000132 | | ) OFFSET VALUE & |
| | 125376 | | ) COMPARING, |
| 052156 | 012767 | MOV#24150,LOOP1;90 MILLISEC | ) LOOPING. NOTE |
| | 024150 | | ) THE RESPONSE |
| | 000124 | | ) TIME OF 90 |
| 052164 | 005367 | A:DEC LOOP1 | ) MILLISEC FOR |
| | 000124 | | ) LARGE STEPS, & |
| 052170 | 001375 | BNE A | ) WHEN YOU GET |
| 052172 | 062767 | RESETA:ADD#1,OFFDAC | ) CLOSE TO ZERO, |
| | 000001 | | ) RESPONSE TIME |
| | 000106 | | ) OF 5 MILLI- |
| 052200 | 016767 | MOV OFFDAC,OFFSET | ) SECONDS. |
| | 000102 | | ) |
| | 125346 | | ) |
| 052206 | 012767 | MOV#4440,LOPP1; 5MILLISEC | ) |
| | 004440 | | ) WHEN A/D OUT- |
| | 000074 | | ) PUT RAMPS |
| 052214 | 005367 | B:DEC LOOP1 | ) GREATER THAN 9V |
| | 000070 | | ) LIMIT RESET IT |
| 052220 | 001375 | BNE B | ) CLOSE TO ZERO |
| 052222 | 005267 | INC SET | ) BY CHANGING THE |
| | 125322 | | ) OFFSET VALUE & |
| 052226 | 105767 | WATHO:TSTB SET | ) COMPARING, |
| | 125316 | | ) LOOPING.NOTE THE |
| 052232 | 100375 | BPL WATHO | ) RESPONSE TIME |
| 052234 | 026727 | CMP DATA,#177631 | ) OF 90MILLISEC |
| | 125312 | | ) FOR LRG STEPS & |
| | 177631 | | ) WHEN YOU GET |
| 052242 | 100001 | BPL CONTIN | ) CLOSE TO ZERO, |
| 052244 | 000752 | BR RESETA | ) RESPONSE TIME |
| 052246 | 016767 | CONTIN:MOV N,X | ) OF 5 MILLISEC- |

|          |          |            |                         |                     |
|----------|----------|------------|-------------------------|---------------------|
|          | 001276   |            |                         | ) ORDS.             |
|          | 001244   |            |                         | )                   |
| 052254   | 016767   |            | MOV INFSA,INIS; RESET   |                     |
|          |          |            |                         | HOPPER/SAMPLE       |
|          | 001232   |            |                         |                     |
|          | 001226   |            |                         |                     |
|          | ROEGE    | 015        |                         |                     |
| 052262   | 005067   |            | CLR Y                   | )                   |
|          | 001226   |            |                         | )                   |
|          |          |            |                         | ) ZERO ALL REGS;    |
| 052266   | 005067   |            | CLR Y+2                 | ) FIRST SET FEED    |
|          | 001224   |            |                         | ) SWITCH TRIG       |
| 052272   | 005067   |            | CLR XY                  | ) DUE TO THE        |
|          | 001236   |            |                         | ) NEED FOR RE-      |
| 052276   | 005067   |            | CLR XY+2                | ) SETTING.          |
|          | 001234   |            |                         |                     |
| 052302   | 004767   |            | JSR PC,RESTORE;RETURN TO PREVIOUS |            |
|          |          |            |                         | TASK.               |
|          | 000050   |            |                         |                     |
| 052306   | 000000   | OFFDAC:0   |                         |                     |
| 052310   | 000000   | LOOP1:0    |                         |                     |
| 052312   | 000000   | HPREMP:HALT;IF HOPPER IS EMPTY HALT. |            |                     |
| 052314   | 005267   | ACRILOCK:  | INC ACRILK              | )                   |
|          | 001266   |            |                         | )                   |
| 052320   | 005267   |            | INC UPDAT               | ) SET ACRILOCK      |
|          | 001162   |            |                         | ) FLAG.             |
| 052324   | 004767   |            | JSR PC,RESTORE          | )                   |
|          | 000026   |            |                         |                     |
| 052330   | 012667   | SAVE:      | MOV (SP)+, SAV          | )                   |
|          | 000016   |            |                         | )                   |
| 052334   | 010046   |            | MOV R0,(SP)-            | )                   |
| 052336   | 010146   |            | MOV R1,(SP)-            | )                   |
| 052340   | 010246   |            | MOV R2,(SP)-            | )SAVE SUBROUTINE    |
| 052342   | 010346   |            | MOV R3,(SP)-            | )                   |
| 052344   | 010446   |            | MOV R4,(SP)-            | )                   |
| 052346   | 010546   |            | MOV R5,(SP)-            | )                   |
| 052350   | 000137   |            | JMP @(PC)+              | )                   |
| 052352   | 000000   | SAV:       | 0                       | )                   |
| 052354   | 000000   | SAV1:      | 0                       | )                   |
| 052356   | 005726   | RESTORE:   | TST (SP)+               | )                   |
| 052360   | 012605   |            | MOV (SP)+,R5            | )                   |
| 052362   | 012604   |            | MOV (SP)+,R4            | )                   |
| 052364   | 012603   |            | MOV (SP)+,R3            | ) RESTORE           |
| 052366   | 012602   |            | MOV (SP)+,R2            | ) SUBROUTINE.       |
| 052370   | 012601   |            | MOV (SP)+,R1            | )                   |

| | | | | |
|---|---|---|---|---|
| ø52372 | ø12600 | | MOV (SP)+,Rø | ) RESTORE |
| ø52374 | øøøøø2 | | RTI | ) SUBROUTINE ) |
| ø52376 | ø16746 | INIT: | MOV TABLE1+12,(SP)- | ) # SAMPLES ) YOU COME HERE |
| | 176ø1ø | | | ) AFTER ANSWERING ) QUESTIONS TO |
| ø524ø2 | ø16746 | | MOV TABLE1+1ø,(SP)- | ESTABLISH A NEW SET OF |
| | 176øø2 | | | OPERATING PARAMETERS. |
| ø524ø6 | øø4467 | | JSR R4, SPOLSH | |
| | ø12534 | | | |
| ø52412 | ø65ø24 | | $RI | |
| ø52414 | ø52416 | | .WORD .+2 | |
| ø52416 | ø12667 | | MOV (SP)+,HOLD; INTEGER # SAMPLES | |
| | øø1226 | | | |
| ø52422 | ø16746 | | MOV TABLE1+12,(SP)- | ) |
| | 175764 | | | ) |
| | RQ@GE | ø16 | | ) |
| ø52426 | ø16746 | | MOV TABLE1+1ø,(SP)- | ) |
| | 175756 | | | ) |
| ø52432 | ø16746 | | MOV TABLE1+12,(SP)- | ) |
| | 175754 | | | ) |
| ø52436 | ø16746 | | MOV TABLE1+1ø,(SP)- | ) CALCULATE NEW ) $\leq x =$ |
| | 175746 | | | ) $\frac{x(x+1)}{z}$ |
| ø52442 | øø5ø46 | | CLR (SP)- | ) |
| ø52444 | ø12746 | | MOV #ONEF,(SP)- | ) |
| | ø4ø2ø3 | | | |
| ø5245ø | øø4467 | | JSR R4, POLSH | ) |
| | ø12472 | | | |
| ø52454 | ø57452 | | SADR | ) |
| ø52456 | ø64412 | | SFLR | ) |
| ø5246ø | ø52462 | | .WORD .+2 | ) |
| ø52462 | øø5ø46 | | CLR (SP)- | ) |
| ø52464 | ø12746 | | MOV #TWOF,(SP)- | ) |
| | ø4ø4øø | | | ) |
| ø5247ø | øø4467 | | JSR R4, SPOLSH | ) CALCULATE NEW |
| | ø12452 | | | ) $\leq x =$ |
| ø52474 | ø635øø | | $DVR | ) $\frac{x(x+1)}{z}$ |
| ø52476 | ø525øø | | .WORD .+2 | ) |
| ø525øø | ø12667 | | MOV (SP)+,HOLD1 | ) |
| | øø1146 | | | ) PUT IT IN ) STORAGE |
| ø525ø4 | ø12667 | | MOV (SP)+,HOLD2 | ) |
| | øø1144 | | | |
| ø5251ø | øø5ø46 | | CLR (SP)- | ) |
| ø52512 | ø1274ø | | MOV #ONEF,(SP)- | ) |

|         |         |       |                       |                    |
|---------|---------|-------|-----------------------|--------------------|
|         | 040200  |       |                       |                    |
| 052516  | 016746  |       | MOV TABLE1+12,(SP)-   |                    |
|         | 175670  |       |                       |                    |
| 052522  | 016746  |       | MOV TABLE1+10,(SP)    |                    |
|         | 175662  |       |                       |                    |
| 052526  | 005046  |       | CLR (SP)-             | CALCULATE NEW      |
| 052530  | 012746  |       | MOV #TWOF,(SP)-       | $\leq x^2$ =       |
|         | 040400  |       |                       | $\frac{(2x+1)(x+1)(x)}{6}$ |
| 052534  | 004467  |       | JSR R4,SPOLSH         |                    |
|         | 012406  |       |                       |                    |
| 052540  | 064412  |       | SMLR                  |                    |
| 052542  | 057452  |       | SADR                  |                    |
| 052544  | 052546  |       | .WORD .+2             |                    |
| 052546  | 016746  |       | MOV TABLE1+12,(SP)-   |                    |
|         | 175640  |       |                       |                    |
| 052552  | 016746  |       | MOV TABLE1+10,(SP)-   |                    |
|         | 175632  |       |                       |                    |
| 052556  | 016746  |       | MOV TABLE1+12,(SP)-   |                    |
|         | 175630  |       |                       |                    |
| 052562  | 016746  |       | MOV TABLE1+10,(SP)-   |                    |
|         | 175622  |       |                       |                    |
| 052566  | 005046  |       | CLR (SP)-             |                    |
| 052570  | 012746  |       | MOV #ONEF,(SP)-       |                    |
|         | 040200  |       |                       |                    |
|         | DQEGE   | 017   |                       |                    |
| 052574  | 004467  |       | JSR R4,SPOLSH         |                    |
|         | 012346  |       |                       |                    |
| 052600  | 057452  |       | SADR                  |                    |
| 052602  | 064412  |       | SMLR                  |                    |
| 052604  | 064412  |       | SMLR                  | CALCULATE NEW      |
| 052606  | 052610  |       | .WORD .+2             | $\leq x^2$ =       |
| 052610  | 005046  |       | CLR (SP)-             | $\frac{(2x+1)(x+1)(x)}{6}$ |
| 052612  | 012746  |       | MOV #SIXF,(SP)-       |                    |
|         | 040200  |       |                       |                    |
| 052616  | 004467  |       | JSR R4,SPOLSH         |                    |
|         | 012324  |       |                       |                    |
| 052622  | 063500  |       | SDVR                  |                    |
| 052624  | 052626  |       | .WORD .+2             |                    |
| 052626  | 012667  |       | MOV (SP)+,HOLD5       | PUT IT IN          |
|         | 001024  |       |                       | STORAGE            |
| 052632  | 012667  |       | MOV (SP)+,HOLD4       |                    |
|         | 001022  |       |                       |                    |

```
Ø52636    Ø16746           MOV TABLE1+42,(SP)-)
          175600                              )
Ø52642    Ø16746           MOV TABLE1+4Ø,(SP)-)
          175572                              )
Ø52646    ØØ4467           JSR R5,SPOLSH      )
          Ø12274                              )
Ø52652    Ø65Ø24           SRI                ) CONVERT TO
                                              ) INTEGER
Ø52654    Ø52656           .WORD .+2          )
Ø52656    Ø12667           MOV (SP)+,HOLD5;PUT IT IN
                                              STORAGE
          ØØ1ØØØ
Ø52662    Ø16746           MOV TABLE1+22,(SP)-)
          175534                              )
Ø52666    Ø16746           MOV TABLE1+2Ø,(SP)-) CONVERT NEW
          175526                              ) #SMALL
                                              ) SAMPLES PER
                                              ) LARGE SAMPLE
Ø52672    ØØ4467           JSR R4,SPOLSH      ) & CONVERT TO
          Ø12250                              ) INTEGER.
Ø52676    Ø65Ø24           SRI                )
Ø527ØØ    Ø527Ø2           .WORD .+2          )
Ø527Ø2    Ø12667           MOV (SP)+,HOLD6; PUT IT IN
                                              STORAGE
          ØØØ756
Ø527Ø6    Ø16746           MOV TABLE1+32,(SP)-)
          175520                              )
Ø52712    Ø16746           MOV TABLE1+3Ø,(SP)-)
          175512                              )CONVERT NEW #
                                              )SMALL SAMPLES
                                              )BEFORE SWITCH-
Ø52716    ØØ4467           JSR R4,SPOLSH      )ING TO LARGE
          Ø12224                              ) SAMPLES &
                                              )CONVERT TO
Ø52722    Ø65Ø24           SRI                )INTEGER.
Ø52724    Ø52726           .WORD .+2          )
Ø52726    Ø12667           MOV (SP)+,HOLD7;PUT IT IN
                                              STORAGE
          ØØØ734
Ø52732    ØØ5Ø67           CLR LES;TURN OFF THE REAL TIME
                                              CLOCK
          124612
Ø52736    ØØ5Ø67           CLR XY             )
          ØØØ572                              )
          RQSGN     Ø2Ø                       ) ZERO THE
                                              ) SUMS.
Ø52742    ØØ5Ø67           CLR XY+2           )
          ØØØ57Ø                              )
Ø52746    ØØ5Ø67           CLR Y              )
          ØØØ542                              ) ZERO THE SUMS.
Ø52752    ØØ5Ø67           CLR Y+2            )
```

```
            000540
052756  016767          MOV HOLD8,SAMS01
        000706
        000572
052764  016767          MOV HOLD9,SAMS01+2
        000702
        000566
052772  016767          MOV HOLD7,LOS
        000670
        000612
053000  016767          MOV HOLD6,SSLST
        000660
        000626
053006  016767          MOV HOLD5,ERRSW
        000650
        000556
053014  016767          MOV HOLD4,X2+2
        000640
        000504
053022  016767          MOV HOLD3,X2
        000630
        000474
053030  016767          MOV HOLD2,X1+2
        000620
        000474
053036  016767          MOV HOLD1,X1
        000610
        000464
053044  016767          MOV HOLD,N
        000600
        000476
053052  016767          MOV SSLST,SSLSTI
        000556
        000556
053060  016767          MOV N,X
        000464
        000432
053066  016767          MOV TABLE1,PR
        175306
        000526
053074  016767          MOV TABLE1+2,PR+2
        175302
```

) MOVE THE NEW
) PARAMETERS INTO
) REAL TIME
) VARIABLES
) DURING THE TIME
) WHEN THE CLOCK
) IS OFF SO THAT
) THE TRANSITION
) DOES NOT OCCUR
) IN THE MIDDLE
) OF A SAMPLE
) PERIOD.

) MOVE THE NEW
) PARAMETERS INTO
) REAL TIME

|         |         |                        |                    |
|---------|---------|------------------------|--------------------|
|         | 000522  |                        | ) VARIABLES        |
| 053102  | 016767  | MOV TABLE1+10,N1       | ) DURING THE       |
|         | 175302  |                        | ) TIME WHEN THE    |
|         | 000442  |                        | ) CLOCK IS OFF     |
|         | RQ6GE   | 021                    | ) SO THAT THE      |
| 053110  | 016767  | MOV TABLE1+12,N1+2     | ) TRANSITION       |
|         | 175276  |                        | ) DOES NOT OCCUR   |
|         | 000436  |                        | ) IN THE MIDDLE    |
| 053116  | 016767  | MOV TABLE1+14,SE       | ) OF A SAMPLE      |
|         | 175272  |                        | ) PERIOD.          |
|         | 000452  |                        | )                  |
| 053124  | 016767  | MOV TABLE1+16,SE+2     |                    |
|         | 175266  |                        | )                  |
|         | 000446  |                        | )                  |
| 053132  | 016767  | MOV TABLE1+34,LE       | )                  |
|         | 175276  |                        | )                  |
|         | 000442  |                        | )                  |
| 053140  | 016767  | MOV TABLE1+36,LE+2     | )                  |
|         | 175272  |                        | )                  |
|         | 000436  |                        | ) MOVE THE         |
| 053146  | 016767  | MOV TABLE1+24,K        | ) NEW PARA-        |
|         | 175252  |                        | ) METERS INTO      |
|         | 000442  |                        | ) REAL TIME        |
| 053154  | 016767  | MOV TABLE1+26,K+2      | ) VARIABLES        |
|         | 175246  |                        | ) DURING THE       |
|         | 000436  |                        | ) TIME WHEN THE    |
| 053162  | 016767  | MOV INTSAM,INTSA       | ) CLOCK IS OFF     |
|         | 000506  |                        | ) SO THAT THE      |
|         | 000322  |                        | ) TRANSITION       |
| 053170  | 016767  | MOV INTSA,INTS         | ) DOES NOT OCCUR   |
|         | 000316  |                        | ) IN THE           |
|         | 000312  |                        | ) MIDDLE OF A      |
| 053176  | 016767  | MOV TABLE1+20,SSLSTR   | ) SAMPLE           |
|         | 175216  |                        | ) PERIOD.          |
|         | 000434  |                        | )                  |
| 053204  | 016767  | MOV TABLE1+22,SSLSTR+2 | )                  |
|         | 175212  |                        |                    |
|         | 000430  |                        |                    |
| 053212  | 005067  | CLR AVG                | )                  |
|         | 000412  |                        | ) ZERO AVG.        |
| 053216  | 005067  | CLR AVG+2              | )                  |
|         | 000410  |                        |                    |

```
Ø53222    Ø167Ø6              MOV STKST,SP        )
          ØØØ42Ø                                  ) RESET THE
                                                  ) STACK
Ø53226    ØØ5746              TST (SP)-
Ø5323Ø    Ø52767              BIS #4Ø,LKS;TURN ON THE RUM TIME
                                                     CLOCK.
          ØØØØ4Ø
          124312
Ø53236    ØØ5767    TEST:     TST UPDAT;HAS A NEW FEEDRATE
                                  BEEN CALCULATED?
          ØØØ244
Ø53242    ØØ1ØØ3              BNE NEWDAT;YES PRINT IT
Ø53244    ØØØØØ1              WAIT;NO-WAIT FOR INTERRUPT.
Ø53246    ØØØ167              JMP TEST;RETURN HERE FROM
                                  INTERRUPT.
          177764
Ø53252    ØØ5267    NEWDAT:   INC CR              )
          ØØØ16Ø                                  )
          RQGE      Ø22                           )
Ø53256    ØØ5767              TST ACRILK          )
          ØØØ324                                  )
Ø53262    ØØ14Ø7              BEQ AB              )
Ø53264    Ø16767              MOV TEMP,TEM        )
          ØØØ272                                  )
          ØØØ21Ø                                  )
Ø53272    Ø16767              MOV TEMP+2,TEM+2    )
          ØØØ266                                  ) PRINT OUT
          ØØØ2Ø4                                  ) NEW FEED
Ø533ØØ    ØØØ4Ø6              BR ABC              ) RATE ON TTY;
Ø533Ø2    Ø16767    AB:       MOV PREV,TEM        ) 5 PRINTOUTS
          ØØØ26Ø                                  ) PER LINE,
          ØØØ172                                  ) WITH * IF IT
Ø5331Ø    Ø16767              MOV PREV+2,TEM+2    ) ACRILOK
          ØØØ254                                  )
          ØØØ166                                  )
Ø53316    ØØ5Ø67    ABC:      CLR UPDAT           )
          ØØØ164                                  )
Ø53322    Ø12746              MOV #BUFF,(SP)-     )
          Ø53456                                  )
Ø53326    Ø12746              MOV #14.,(SP)-      )
          ØØØØ16                                  )
Ø53332    Ø12746              MOV #5,(SP)-        )
          ØØØØØ5                                  )
Ø53336    ØØ5Ø46              CLR (SP)-           )
                                                  )
```

| | | | | |
|---|---|---|---|---|
| 053340 | 016746 | | MOV TEM+2,(SP)- | ) |
| | 000140 | | | ) |
| 053344 | 016746 | | MOV TEM,(SP)- | ) |
| | 000132 | | | ) |
| 053350 | 004767 | | JSR PC,$GCO | ) |
| | 006310 | | | ) |
| 053354 | 005767 | | TST ACRILK | ) |
| | 000226 | | | ) |
| 053360 | 001405 | | BEQ AC | ) |
| 053362 | 012767 | | MOV #'*,BUFF | ) PRINT OUT |
| | 000052 | | | ) NEW FEED |
| | 000066 | | | ) RATE ON TTY; |
| 053370 | 005067 | | CLR ACRILK | ) 5 PRINTOUTS |
| | 000212 | | | ) PER LINE, WITH |
| 053374 | 022767 | AC: | CMP #5,CR | ) * IF IN |
| | 000005 | | | ) ACRILOK. |
| | 000034 | | | ) |
| 053402 | 001005 | | BNE OUT1 | ) |
| 053404 | 005067 | | CLR CR | ) |
| | 000026 | | | ) |
| 053410 | 000004 | | IOT | ) |
| 053412 | 053440 | | .WORD CRLF | ) |
| 053414 | 012 | | .BYTE WRITE,1 | ) |
| 053415 | 001 | | | ) |
| 053416 | 000004 | OUT1: | IOT | ) |
| | 000023 | | | ) |
| 053420 | 053450 | | .WORD BBUFF | ) |
| 053422 | 012 | | .BYTE WRITE,1 | ) PRINT OUT |
| 053423 | 001 | | | ) NEW FEED |
| 053424 | 000004 | WAIT: | IOT | ) RATE ON TTY; |
| 053426 | 053424 | | .WORD WAIT | ) |
| 053430 | 004 | | .BYTE WAITR,1 | ) 5 PRINTOUTS |
| 053431 | 001 | | | ) PER LINE, WITH |
| 053432 | 000167 | | JMP TEST | ) * IF IN |
| | 177600 | | | ) ACRILOK. |
| 053436 | 000000 | | CR:0 | ) |
| 053440 | 000002 | CRLF: | 2 | ) |
| 053442 | 000000 | | 0 | ) |
| 053444 | 000002 | | 2 | ) |
| 053446 | 015 | | .BYTE 15,12 | ) |
| 053447 | 012 | | | ) |
| 053450 | 000016 | BBUFF: | 14. | ) |

```
Ø53452   ØØØØØØ                   Ø                    )
Ø53454   ØØØØ16                   14.                  )
         Ø53502    BUFF:          .=.+2Ø.              )
         Ø53506    TEM:           .=.+4                )
Ø53506   ØØØØØØ    UPDAT:         Ø                    )
Ø5351Ø   ØØØØØØ                   INTS: Ø              ) LOCATIONS
Ø53512   ØØØØØØ    INTSV:         Ø                    ) FOR VARIABLES
Ø53514   ØØØØØØ    Y:             Ø,Ø                  ) FLAGS, &
Ø53516   ØØØØØØ                                        ) BUFFERS
Ø5352Ø   ØØØØØØ    X:             Ø,Ø                  )
Ø53522   ØØØØØØ                                        )
Ø53524   ØØØØØØ    X2:            Ø,Ø                  )
Ø53526   ØØØØØØ                                        )
Ø5353Ø   ØØØØØØ    X1:            Ø,Ø                  )
Ø53532   ØØØØØØ                                        )
Ø53534   ØØØØØØ    XY:            Ø,Ø                  )
Ø53536   ØØØØØØ                                        )
Ø5354Ø   ØØØØØØ    XYC:           Ø,Ø                  )
Ø53542   ØØØØ1Ø                                        )
Ø53544   ØØØØØØ    YC:            Ø,Ø                  )
Ø53546   ØØØØØØ                                        )
Ø5355Ø   ØØØØØØ    N:             Ø                    )
Ø53552   ØØØØØØ    N1:            Ø,Ø                  )
Ø53554   ØØØØØØ                                        )
Ø53556   ØØØØØØ    SAMSØ1:        Ø,Ø                  )
Ø5356Ø   ØØØØØØ                                        ) LOCATIONS
Ø53562   ØØØØØØ    TEMP:          Ø,Ø                  ) FOR
Ø53564   ØØØØØØ                                        ) VARIABLES,
Ø53566   ØØØØØØ    PREV:          Ø,Ø                  ) FLAGS,
Ø5357Ø   ØØØØØØ                                        ) AND
Ø53572   ØØØØØØ    ERRSW:         Ø,Ø                  ) BUFFERS
Ø53574   ØØØØØØ                                        )
Ø53576   ØØØØØØ    SE:            Ø,Ø                  )
Ø536ØØ   ØØØØØØ                                        )
         ROUGE             Ø24                         )
Ø536Ø2   ØØØØØØ    LE:            Ø,Ø                  )
Ø536Ø4   ØØØØØØ                                        )
Ø536Ø6   ØØØØØØ    ACRILK:        Ø,Ø                  )
Ø5361Ø   ØØØØØØ                                        )
Ø53612   ØØØØØØ    LOS:           Ø,Ø                  )
Ø53614   ØØØØØØ                                        )
```

```
Ø53616  ØØØØØØ    K:       Ø,Ø       )
Ø5362Ø  ØØØØØØ                       )
Ø53622  ØØØØØØ    FR:      Ø,Ø       )
Ø53624  ØØØØØØ                       )
Ø53626  ØØØØØØ    CONWOR:  Ø         )
Ø5363Ø  ØØØØØØ    AVG:     Ø,Ø       )
Ø53632  ØØØØØØ                       )
Ø53634  ØØØØØØ    SSLST:   Ø         )
Ø53636  ØØØØØØ    SSLST1:  Ø         )
Ø5364Ø  ØØØØØØ    SSLSTR:  Ø,Ø       )
Ø53642  ØØØØØØ                       )
Ø53644  ØØØØØØ    LOOP:    Ø         )
Ø53646  ØØØØØØ    STKST:   Ø         )
Ø5365Ø  ØØØØØØ    HOLD:              ) LOCATIONS
Ø53652  ØØØØØØ    HOLD1:   Ø         ) FOR
Ø53654  ØØØØØØ    HOLD2:   Ø         ) VARIABLES,
Ø53656  ØØØØØØ    HOLD3:   Ø         ) FLAGS,
Ø5366Ø  ØØØØØØ    HOLD4:   Ø         ) AND
Ø53662  ØØØØØØ    HOLD5:   Ø         ) BUFFERS
Ø53664  ØØØØØØ    HOLD6:   Ø         )
Ø53666  ØØØØØØ    HOLD7:   Ø         )
Ø5367Ø  ØØØØØØ    HOLD8:   Ø         )
Ø53672  ØØØØØØ    HOLD9:   Ø         )
Ø53674  ØØØØØØ    INTSAM:  Ø         )
        ØØØØØ1    .END               )
        PQ#GE     Ø25                )
```

SYMBOL TABLE LISTING

| | | | | | | | |
|---|---|---|---|---|---|---|---|
| A | Ø52164 | AD | Ø533Ø2 | ADC | Ø53316 | AC | Ø53374 |
| ACRILK | Ø536Ø6 | ACRILO | Ø52314 | ASK | Ø5Ø66Ø | AVG | Ø5363Ø |
| B | Ø52214 | BBUFF | Ø5345Ø | BUFP | Ø53456 | BUFFER | Ø5Ø25Ø |
| CALC | Ø51Ø44 | CALL | Ø51714 | CK | Ø5Ø746 | CNTR | Ø516Ø4 |
| CONTIN | Ø52246 | CONWOR | Ø53626 | CR | Ø53436 | CRLF | Ø5344Ø |
| DATA | =177552 | DFLOAT | Ø51766 | ERRSW | Ø53572 | FR | Ø53622 |
| HOLD | Ø5365Ø | HOLD1 | Ø53652 | HOLD2 | Ø53654 | HOLD3 | Ø53656 |
| HOLD4 | Ø5366Ø | HOLD5 | Ø53662 | HOLD6 | Ø53664 | HOLD7 | Ø53666 |
| HOLD8 | Ø5367Ø | HOLD9 | Ø53672 | HPREMP | Ø52312 | INIT | Ø52376 |
| INT | Ø5Ø722 | INTS | Ø5351Ø | INTSA | Ø53512 | INTSAM | Ø53674 |
| K | Ø53616 | LAR | Ø51634 | LARGE | Ø51436 | LE | Ø536Ø2 |
| LINK | Ø5Ø716 | LKS | =177550 | LOOP | Ø53644 | LOOP1 | Ø5231Ø |
| LOS | Ø53612 | MORE | Ø5Ø76 | MR | Ø52112 | MTABLE | Ø5Ø356 |
| MULTY | Ø521ØØ | N | Ø5355Ø | NEWDAT | Ø53252 | NOD27 | Ø52Ø42 |
| NOM27 | Ø52Ø3Ø | N1 | Ø53552 | OFFDAC | Ø523Ø6 | OFFSET | =177554 |
| ONEF | =Ø4Ø2ØØ | OUT | 177554 | OUT1 | Ø53416 | OVER27 | Ø52Ø12 |
| OVR | Ø5141Ø | PC | =ØØØØØ7 | POS27 | Ø52Ø2Ø | PREV | Ø53566 |
| READ | =ØØØØ11 | RESET | Ø52134 | RESETA | Ø52172 | RESTOR | Ø52356 |

| | | | | | | | |
|---|---|---|---|---|---|---|---|
| RTRN | 052076 | R0 | =%000000 | R1 | =%000001 | R2 | =%000002 |
| R3 | =%000003 | R4 | =%000004 | R5 | =%000005 | R6 | =%000006 |
| SAMPLE | 050736 | SAMS01 | 053556 | SAV | 052352 | SAVE | 052330 |
| SAV1 | 052354 | SE | 053576 | SET | = 177550 | SIXP | = 040700 |
| SP | =%000006 | SSLST | 053634 | SSLSTR | 053640 | SSLSTI | 053636 |
| START | 050000 | STKST | 053646 | TABLE | 050450 | TABLE2 | 050714 |
| TABLE1 | 050400 | TABLE2 | 050472 | TABLE3 | 050506 | TABLE4 | 050522 |
| TABLE5 | 050544 | TABLE6 | 050570 | TABLE7 | 050604 | TABLE8 | 050630 |
| TABLE9 | 050662 | TEM | 053502 | TEMP | 053562 | TEST | 053236 |
| TSTE | 051446 | TXOP | = 040400 | UPDAT | 053506 | UPDATE | 051516 |
| WAIT | 053424 | WAITR | = 000004 | WAITT | 054116 | WATHC | 052226 |
| WBUFFE | 050104 | WRITE | = 000012 | X | 053524 | XY | 053534 |
| XYC | 053540 | X1 | 053550 | X2 | 053524 | Y | 053514 |
| YC | 053544 | ZER27 | 052474 | ZXOR | = 057452 | ZSBR | = 064246 |
| SDVR | = 063500 | SGCO | = 061604 | SIR | = 064146 | SL3 | = 064232 |
| SML.R | = 064412 | SNG.R | = 064772 | SOL.SH | = 065140 | SRC1 | = 064264 |
| SRI | = 065024 | SSBR | = 057446 | . | | = 053676 | | |
| 000000 | ERRORS | | | | | | |
| °S | | | | | | | |

From the foregoing disclosure, it can be seen that the instant invention provides an improved weigh feeding apparatus, wherein the discharge rate of a substance from a container may be maintained at a preselected constant value, wherein the container may be automatically refilled during the continuous discharge of the substance, wherein excessive excursions of the system are eliminated, wherein extraneous data recordings are eliminated when calculating the flow rate, and wherein past flow rate values may be stored in memory and compensated for at a later point in time.

Although a certain particular embodiment of the invention has been herein disclosed for purposes of explanation, various modifications thereof, after study of the specification, will be apparent to those skilled in the art to which the invention pertains.

What is claimed and desired to be secured by Letters Patent is:

1. A weigh feeding machine comprising
a container for a substance;
discharge means for discharging the substance from the container at a controllable feed-out rate;
storage means for storing a first electrical signal corresponding to the desired feed-out rate;
means for sensing the weight of at least the substance being discharged and for producing a second electrical signal having a characteristic which corresponds to the value of said weight and changes for the different values of weight sensed;
digital circuit means for sampling the second electrical signal a plurality of times during each of a succession of time intervals;
storage means for storing the samples of said second electrical signal during each time interval;
digital computer means for computing a feed-out rate during each such time interval, from the samples taken during one such time interval, and for comparing an electrical signal representative of said computed feed-out rate with the first electrical signal representative of said desired feed-out rate, for producing, as a result of said comparison, a control electrical signal indicative of the desired changes, if any, in the feed-out rate of the discharge means; and
control means for controlling the discharging means in accordance with said control electrical signal to thereby maintain the feed-out of the substance from the container at the desired feed-out rate.

2. A weigh feeding machine as in claim 1, further including
means for storing a series of third electrical signals which represent correction signals, and
means within said digital computing means for combining the samples of said second signal with respective ones of said third signals, before the feed-out rate is computed from said samples, to compensate said samples with said correction signals.

3. A weigh feeding machine as in claim 1, further including
means within said digital computing means for computing a mean value from the samples received during each said time interval,
means for comparing each sample received during one of said time intervals with the mean value computed for that time interval, and
means for excluding from the feed-out rate computations any samples which deviate from the computed mean value more than a predetermined amount.

4. A weigh feeding machine as in claim 3, further including
means for counting the number of samples during each time interval which deviate from the computed mean value more than said predetermined amount.

5. A weigh feeding machine as in claim 4, further including
means for inhibiting the generation of a new control electrical signal, and maintaining said control electrical signal at a value corresponding to one or more preceding control electrical signals, when said counting means exceeds a predetermined count during any of said time intervals.

6. A weigh feeding machine as in claim 1, further including
means for sensing when a selected number of said samples deviate more than a predetermined amount from at least one adjacent sample.

7. A weigh feeding machine as in claim 6, wherein said means for sensing senses when a selected number of samples greater than one deviates more than said predetermined amount from the other samples in the same time interval.

8. A weigh feeding machine as in claim 6, further including
means for inhibiting the generation of a new control electrical signal, and maintaining said control electrical signal at a value corresponding to one or more preceding control electrical signals, when said selected number of samples deviates more than said predetermined amount during any of said time intervals.

* * * * *

Disclaimer 4,301,510.—*Ronald J. Ricciardi*, Garfield; *Angelo Ferrara*, Fairfield and *Joseph L. Hartmann*, West Caldwell, N.J. WEIGH FEEDER SYSTEM. Patent dated Nov. 17, 1981. Disclaimer filed Jan. 16, 1984, by the assignee, *Acrison, Inc.*

The term of this patent subsequent to Oct. 18, 1994 has been disclaimed.

[*Official Gazette April 3, 1984.*]